US012018202B2

(12) United States Patent
Crytzer et al.

(10) Patent No.: US 12,018,202 B2
(45) Date of Patent: Jun. 25, 2024

(54) FUNCTIONAL GRAPHENIC MATERIALS FOR USE AS ADHESIVES AND SEALANTS

(71) Applicant: Carnegie Mellon University, Pittsburgh, PA (US)

(72) Inventors: Kurtis R. Crytzer, Concord, NC (US); Stefanie A. Sydlik, Pittsburgh, PA (US); Anne M. Arnold, Richland, WA (US); Brian D. Holt, Wilmington, NC (US); Karoline E. Eckhart, Pittsburgh, PA (US)

( * ) Notice: Subject to any disclaimer, the term of this patent is extended or adjusted under 35 U.S.C. 154(b) by 605 days.

(21) Appl. No.: 16/825,001

(22) Filed: Mar. 20, 2020

(65) Prior Publication Data

US 2020/0299557 A1    Sep. 24, 2020

Related U.S. Application Data

(60) Provisional application No. 62/919,682, filed on Mar. 22, 2019.

(51) Int. Cl.
| | | |
|---|---|---|
| *C08K 3/12* | (2006.01) | |
| *C09J 5/00* | (2006.01) | |
| *C09J 167/04* | (2006.01) | |
| *C09K 3/12* | (2006.01) | |

(52) U.S. Cl.
CPC  *C09K 3/12* (2013.01); *C09J 5/00* (2013.01); *C09J 167/04* (2013.01)

(58) Field of Classification Search
CPC .... C08K 3/042; C08K 3/12; C09J 5/00; C09J 11/04; C09J 167/04
See application file for complete search history.

(56) References Cited

U.S. PATENT DOCUMENTS

| 2014/0311673 | A1  | 10/2014 | Zhao |
| 2015/0140438 | A1  | 5/2015  | Sun et al. |
| 2016/0045644 | A1* | 2/2016  | Jung ..................... C01B 32/168 |
| | | | 424/125 |

(Continued)

FOREIGN PATENT DOCUMENTS

| WO | WO2013181994 A1 | 12/2013 |
| WO | WO2015126480 A9 | 8/2015 |
| WO | WO2017/149474 A1 | 9/2017 |

OTHER PUBLICATIONS

Chang et al. Photocatalytic Activity of Titanium Dioxide Nanoparticles Linked on Chemically Reduced Graphene Oxide through Mussel-inspired Chemistry. Chemistry Letters 2015 44:8, 1068-1070 (Year: 2015).*

(Continued)

*Primary Examiner* — Sanza L. McClendon
(74) *Attorney, Agent, or Firm* — Owens Law Firm, PC

(57) ABSTRACT

The present invention provides certain chemical compounds or materials having adhesive properties or functionality that act as adhesives or sealants in a variety of applications. In particular, the invention, including its various embodiments, relates to certain functional graphenic materials having an attached adhesive moiety that provides adhesive properties or functionality to the resulting compound and that can be used as an adhesive or sealant in a variety of applications, such as in-situ repair of a leak or defect in a tube carrying a fluid, such as a condenser tube in a power plant.

13 Claims, 19 Drawing Sheets

(56) References Cited

U.S. PATENT DOCUMENTS

2018/0269465 A1  9/2018  Hirai et al.

OTHER PUBLICATIONS

Jeongwook et al. Catechol grafted silica particles for enhanced adhesion to metal by coordinate bond, Colloids and Surfaces A: Physicochemical and Engineering Aspects, vol. 511, 2016, pp. 55-63. (Year: 2016).*

L. Fu et al. Preparation and electrocatalytic properties of polydopamine functionalized reduced graphene oxide-silver nanocomposites, Electrocatalysis 2015, 6, 72-76. (Year: 2015).*

Kang, Sung Min et al., "Simultaneous Reduction and Surface Functionalization of Grphene Oxide by Mussle-Inspired Chemistry," Advanced Functional Materials, Jan. 7, 2011, 108-112, vol. 21, No. 1, Wiley-V C H Verlag GMBH & Co. KGAA, DE.

Wei, Cui et al., "A Strong Integrated Strength and Toughness Artificial Nacre Based on Dopamine Cross-Linked Graphene Oxide," ACS Nano, Aug. 12, 2014, 9511-9517, vol. 8, No. 9, American Chemical Society.

Kocacaliskan, I.; Talan, I.; Terzi, I., Antimicrobial Activity of Catechol and Pyrogallol as Allelochemicals, Z. Naturforsch., C, J. Biosci. 2006, 61 (9-10), 639-642.

Amato, A.; Migneco, L. M.; Martinelli, A.; Pietrelli, L.; Piozzi, A.; Francolini, I., Antimicrobial Activity of Catechol Functionalized-Chitosan versus *Staphylococcus epidermidis*, Carbohydrate Polymers 2018, 179, 273-281, https://doi.org/10.1016/j.carbpol.2017.09.073.

Sydlik, S. A.; Swager, T. M., Functional Graphenic Materials via a Johnson-Claisen Rearrangement. Adv. Funct. Mater. 2013, 23 (15), 1873-1882, https://doi.org/10.1002/adfm.201201954.

Neklyudov, V. V.; Khafizov, N. R; Sedov, A. I.; Dimiev, M. A., New Insights into the Solubility of Graphene Oxide in Water and Alcohols, Physical Chemistry Chemical Physics 2017, 19 (26), 17000-17008. https://doi.org/10.1039/C7CP02303K.

Barbolina, I.; Woods, C. R.; Lozano, N.; Kostarelos, K.; Novoselov, K. S.; Roberts, I. S., Purity of Graphene Oxide Determines Its Antibacterial Activity, 2D Mater. 2016, 3 (2), 025025. https://doi.org/10.1088/2053-1583/3/2/025025.

Forooshani, P. K.; Lee, B. P., Recent Approaches in Designing Bioadhesive Materials Inspired by Mussel Adhesive Protein. Journal of Polymer Science Part A: Polymer Chemistry 2017, 55 (1), 9-33, https://doi.org/10.1002/pola.28368 (published online Oct. 11, 2016).

Saiz-Poseu, J.; Mancebo-Aracil, J.; Nador, F.; Busque, F.; Ruiz-Molina, D., The Chemistry behind Catechol-Based Adhesion, Angewandte Chemie International Edition 2019, 58 (3), 696-714, https://doi.org/10.1002/anie.201801063.

Arnold, Anne M. et al., "Functional Graphenic Materials That Seal Condenser Tube Leaks in Situ", Applied Materials & Interfaces, vol. 11, No. 23, 20881-20887, May 22, 2019.

Jingsong, Peng, et al., Layered Bioinspired Polymer Nanocomposites, Chemical Bulletin, Band 80, vol. 12, 1083-1092, Dec. 31, 2017.

* cited by examiner

FUNCTIONAL GRAPHENIC MATERIALS FOR USE AS ADHESIVES AND SEALANTS

CROSS-REFERENCE TO RELATED APPLICATIONS

This application claims the benefit of provisional Application No. 62/919,682, filed Mar. 22, 2019. The entirety of the foregoing application is incorporated by reference herein.

BACKGROUND OF THE INVENTION

Field of the Invention

The invention, including its various embodiments, relates to certain chemical materials having adhesive properties or functionality to act as adhesives or sealants in a variety of applications. In particular, the invention, including its various embodiments, relates to certain functional graphenic materials having an attached adhesive moiety that have adhesive properties or functionality and that can be used as an adhesive or sealant in a variety of applications, such as in-situ repair of a leak or defect in a tube carrying a fluid, such as a condenser tube in a power plant.

Description of Related Art

Undesirable condenser tube leaks frequently occur in power plants, such as Rankine cycle power plants, resulting in reduced power output, increased burden on downstream systems, and substantial revenue losses. Leaks that are commonly observed can only be addressed with temporary remedial measures, as more permanent remediation measures require complete replacement of the damaged tubes, which requires significant time and money. Currently, physical clogging with particles, such as wood flour, is the industrial standard for non-autogenous repairing (self-healing) condenser tubes. However, wood flour is limited by its strong cohesive properties and lack of adhesive moieties. Further, wood flour has limited potential for chemical modification to impart and tune cohesion and adhesion due to crystallinity and uniformity of the types of functional groups present. Therefore, wood flour is an inadequate solution for condenser tube leaks because it has undesirably high cohesive properties and lacks adhesive properties to form durable seals.

Accordingly, there is a need for an improved sealant for condenser tube leaks. Specifically, there is a need for an improved in-situ sealant that can be used to provide long-term defect repair or a long-term seal for condenser tubes to avoid or minimize other more costly repairs.

BRIEF SUMMARY OF THE INVENTION

In general, the present invention relates to certain chemical compounds or materials having adhesive properties or functionality that act as adhesives or sealants in a variety of applications. In particular, the invention, including its various embodiments, relates to certain functional graphenic materials having an attached adhesive moiety that provides adhesive properties or functionality to the resulting compound and that can be used as an adhesive or sealant in a variety of applications, such as in-situ repair of a leak or defect in a tube carrying a fluid, such as a condenser tube in a power plant.

The chemical composition of the FGMs of the present invention are graphenic scaffolds functionalized with a covalently attached small-molecule that acts as an adhesive or provides the adhesive functionality to the scaffold, such as a catechol-derivative adhesive, to produce a class of functional graphenic materials or FGMs. The FGMs can be derived from various graphenic scaffolds. For example, graphene oxides (GOs), which are atomically thin, micron-sized sheets of carbon atoms bound together and oxidized, can be used as the graphenic scaffold. A derivative of a GO known as Claisen Graphene (CG) may also be used as the graphenic scaffold.

In one embodiment, the FGM comprises a graphenic scaffold and a molecule covalently bonded to said graphenic scaffold having a portion comprising 1,2-dihydroxybenzene capable of adhering to a metal surface. In one embodiment, the graphenic scaffold comprises graphene oxide or Claisen Graphene. In one embodiment, the molecule covalently bonded to the graphenic scaffold comprises a nucleophile that covalently bonds the molecule to the graphenic scaffold and a primary amine. In some embodiments, the molecule is a catechol derivative, such as 3,4-dihydroxybenzylamine.

The FGM can be used as an adhesive or sealant in various applications. For example, the FGM can be used to provide in-situ repair of a tube or pipe leak. In one embodiment, the invention provides a method for reducing a leak in a tube, comprising adding a sealant to a fluid passing through a tube, wherein the sealant comprises a graphenic scaffold having a covalently attached molecule having a portion comprising 1,2-dihydroxybenzene and wherein the tube comprises a leak through which the fluid is passing; adhering the sealant to the tube adjacent to the leak; and forming a seal comprising the sealant, thereby covering the leak.

DETAILED DESCRIPTION OF THE INVENTION

Figure 1:
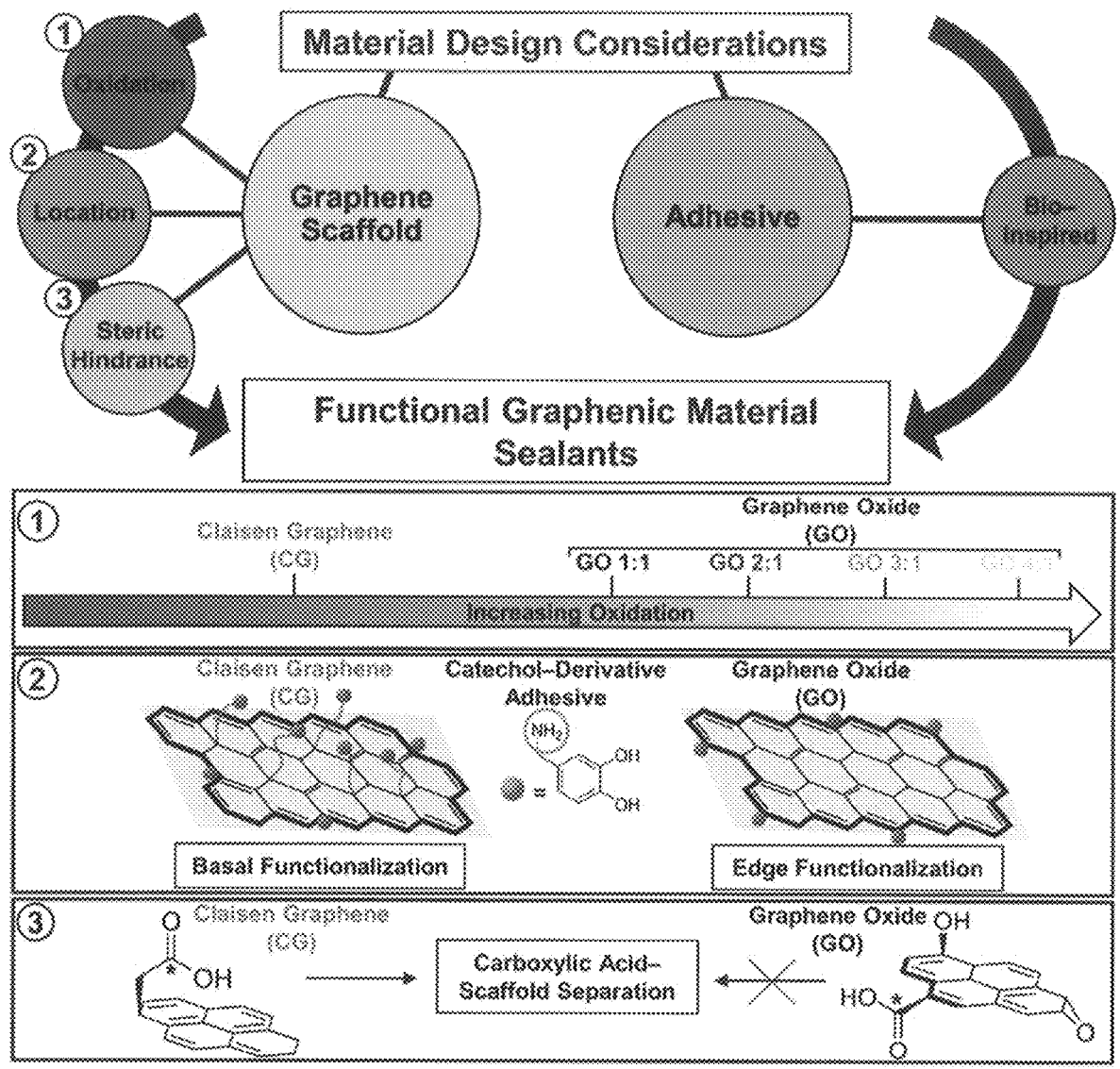
FIG. 1 illustrates the material design considerations to maximize the sealant capacity of functional graphenic material (FGM) sealants according to one embodiment of the invention.

The present invention is more fully described below with reference to the accompanying drawings. While the present invention will be described in conjunction with particular embodiments, such should be viewed as examples and should not be viewed as limiting or as setting forth the only embodiments of the invention. Rather, the present invention includes various embodiments or forms and various related aspects or features and uses, as well as alternatives, modifications, and equivalents all of which are included within the spirit and scope of the invention and the claims, whether or not expressly described herein. Further, the use of the terms "invention," "present invention," "embodiment," and similar terms throughout this description are used broadly and are not intended to mean that the invention requires, or is limited to, any particular embodiment or aspect being described or that such description is the only manner in which the invention may be made or used.

In general, the present invention relates to certain chemical compounds or materials having adhesive properties or functionality that act as adhesives or sealants in a variety of applications. In particular, the invention, including its various embodiments, relates to certain functional graphenic materials having an attached adhesive moiety that provides adhesive properties or functionality to the resulting compound and that can be used as an adhesive or sealant in a variety of applications, such as in-situ repair of a leak or defect in a tube carrying a fluid, such as a condenser tube in a power plant. These materials are referred to as functional graphenic materials ("FGMs") or functional graphenic material sealants, which have adhesive or sealant functionality and the ability to effectively repair or seal defects in a surface, such as a metal surface. In particular, the FGMs of the present invention provide the ability to repair or seal a defect or leak in the metal surface of a tube, such as a power plant condenser tube, to thereby effectively minimize or reduce or eliminate the leak in the tube. Moreover, the FGMs of the present invention provide the ability to repair or seal such defects or leaks in-situ. Accordingly, an FGM can be added to the fluid being transported through the pipe or tube having a defect or leak, such as a leaking condenser tube, while the tube is being used or is in service. The FGM will adhere to the inside surface of the tube at the location of a defect or leak, thereby repairing that defect or leak in-situ without having to take the tube out of service. Moreover, the seal provided by the FGM is a relatively long-term seal that minimizes maintenance that would otherwise be required to repair the leak.

The chemical composition of the FGMs of the present invention are graphenic scaffolds functionalized with a covalently attached small-molecule that acts as an adhesive or provides the adhesive functionality to the scaffold, such as a catechol-derivative adhesive, to produce a class of functional graphenic materials or FGMs. The FGMs can be derived from various graphenic scaffolds. For example, graphene oxides (GOs), which are atomically thin, micron-sized sheets of carbon atoms bound together and oxidized, can be used as the graphenic scaffold. A derivative of a GO known as Claisen Graphene (CG) may also be used as the graphenic scaffold. It should be appreciated that the capacity for chemical modification of the GOs and CG to impart adhesive properties makes these materials particularly useful. In particular, the carboxylic acid content of GOs and CG is utilized to enhance in-situ sealant performance. The carboxylic acids on GOs and CG are used as chemical handles to covalently install the small-molecule that acts as an adhesive (e.g., the adhesive catechol), thereby generating an FGM for use as a sealant or adhesive in various applications. It should be appreciated that it is the small-molecule or molecule that is attached to the scaffold that provides the adhesive functionality to the overall FGM. The adhesive functionality allows for attachment to a given surface to be repaired, such as a metal tube with a surface defect or leak.

The following description in conjunction with the Figures provides further details regarding the FGMs, including their synthesis, resulting properties, and use. Several examples of studies and analyses performed regarding synthesis and properties of the FGMs are also described throughout.

FIG. 1 illustrates the material design considerations to maximize the sealant capacity of functional graphenic material (FGM) sealants according to one embodiment of the invention. As shown, there are two components used to form the FGM, the graphene scaffold and the small-molecule adhesive. In general, the graphene scaffold is synthesized, and the small-molecule adhesive is then covalently attached to generate the FGM having the appropriate or desired adhesion and cohesion to provide a sealant, including a sealant that can be applied to a surface in-situ.

The degree of oxidation (amount of oxygen functional groups), the location of oxygen groups (including carboxylic acids) used to tether the adhesive molecule, and the steric hindrance of carboxylic acid tethers on a given graphene scaffold are all factors that impact sealant performance and are to be considered in designing the FGM. With respect to the graphene scaffold, as shown, the amount of oxidation of the graphene scaffold (shown as number 1), the location of the oxygen groups, including the carboxylic acid groups (shown as number 2), and the steric hindrance of the carboxylic acid tethers (shown as number 3) are all properties that can be used to select an appropriate graphene material. It should be appreciated that adhesion and cohesion are competing properties for purposes of creating an in-situ sealant. The sealant should be able to adhere to metal surfaces, for example, in damaged condenser tubing (adhesion) and coalesce together to form a robust mass that seals the defect or leak (cohesion). However, the cohesive properties cannot be too strong, or the material will aggregate in undamaged areas of the surface to be treated potentially causing unwanted blockages. Accordingly, the foregoing factors can be used in considering the selection of materials for use as a scaffold, including graphenic materials.

In some embodiments, the graphene scaffold may be graphene oxides (GOs), which are atomically thin, micron-sized sheets of carbon atoms bound together and oxidized or a derivative of a GO known as Claisen Graphene (CG). As shown in the corresponding boxes, GOs and CG have different levels of oxidation, different locations of the corresponding oxygen groups on the graphene scaffold, and different steric aspects. However, both may be used in FGMs.

With respect to GO, it should be appreciated that the degree of oxidation of GO can be controlled during synthesis to address the tunability of adhesion and cohesion. By generating a series of GOs with ascending oxidation, carboxylic acid content and basal plane oxidation will also increase. Higher carboxylic acid content creates more chemical handles to install the adhesive, increasing adhesive properties. More basal plane oxidation increases water dispersibility and reduces cohesive properties. The degree of oxidation can be used to modulate both the adhesive and cohesive properties of the FGM materials.

With respect to CG, the graphenic backbone of CG is less oxidized and has a different distribution of functional groups that cannot be accessed just by oxidizing graphite to GO. CG has more carboxylic acid content than GO due to the high surface area of the basal plane, where an abundant number of tertiary alcohols can be converted to carboxylic acids.

The contrast in the location of carboxylic acids on GOs and CG may influence adhesive properties. On GOs the carboxylic acids are localized to sheet edges, whereas tertiary alcohols and epoxides dominate the basal plane. On the other hand, carboxylic acids on CG are delocalized across the basal plane over a larger surface area, which may amplify adhesion when these carboxylic acids are used to covalently tether an adhesive molecule.

The steric hindrance of the carboxylic acids on GOs and CG could influence functionalization efficiency and therefore influence adhesive properties. The GOs have carboxylic acids directly bound to the backbone at the sheet edges, where the backbone can sterically hinder the electrophilic carbon targeted for functionalization. Carboxylic acids on CG, however, are separated from the backbone by a two-carbon spacer. The spacer on CG decreases steric hindrance of the electrophilic carbon, which may promote better functionalization efficiency to enhance adhesive properties.

Further, as noted above, the capacity for chemical modification of the GOs and CG to impart adhesive properties makes these materials particularly useful. In particular, the carboxylic acid content of GOs and CG is utilized to enhance in-situ sealant performance. Thus, the bonding of a small-molecule adhesive to the graphene scaffold provides this functionality. Accordingly, selection of the appropriate GO or CG and corresponding small-molecule adhesive can be used to control adhesion and cohesion to enhance the sealant performance of the FGM, or to tune the adhesion and cohesion of the FGM. For example, adhesive properties of graphene scaffolds can be controlled by the spatial location and amount of the small-molecule adhesive bound to the graphenic sheet, while cohesive properties were influenced by the degree of oxidation on the basal plane.

The small-molecule adhesive may be selected based upon molecules that form robust adhesions to various substrates in a wet environment, which may include certain small molecules derived from or based on molecules produced by various living organisms. For example, mussels form polymers containing catechol moieties that form such adhesions. Accordingly, it was recognized that a catechol derivative can be used as the small-molecule adhesive. For example, as shown, the adhesive is a catechol derivative adhesive. The catechol molecule contains diols on the benzyl backbone that are pivotal for adhesion. This diol functionality may be preserved by selecting a catechol derivative that has an extra pendant group that could be used for covalent linkage, such as 3,4-dihydroxybenzylamine (DHBA), which contains the core catechol moiety and a pendant, primary amine: a strong nucleophile that can react with electrophilic carbons on graphenic substrates. The nucleophilic primary amine on DHBA and the electrophilic carboxylic acids on the graphenic scaffolds that participate in amidation to form FGM sealants are denoted with a circle and asterisks (*), respectively. It should be appreciated that in some embodiments, the adhesive molecules feature a 1,2-dihydroxybenzene that can coordinate and adhere to metal and a nucleophile (primary amine, for example) that can be covalently bound to the graphenic scaffold. Any small molecule that fits these two criteria (contains a 1,2-dihydroxybenzene moiety and a nucleophile) could be used to make an FGM sealant. In some embodiments, any catecholamine may work. For example, tyrosine, DOPA, dopamine, noradrenaline, adrenaline. In some embodiments, 5-hydroxydopamine and 6-hydroxydopamine may be used as the FGM sealant molecule.

Based on the foregoing, it was recognized that GOs and CG are ideal scaffolds that can be used in combination with an attached molecule that provides adhesive properties to form FGMs. The GOs and CG provide ideal scaffolds for in-situ sealants due to modest cohesive properties, water dispersibility, high specific surface area, and oxygen groups that can be utilized as chemical handles to impart adhesion. By modifying the chemical handles on the GO or CG with a wet-adhesive molecule, the resulting FGM is water dispersible that actively coalesces and adheres to defects in substrates. The FGM provides increased cohesive properties that are up to three-fold higher than unfunctionalized materials, which provides for a more stable seal. When applied to leaks in metal condenser tubes, the FGM material basically creates a plug to seal the leak in-situ. To the contrary, unfunctionalized scaffolds completely lack sealant capacity. Moreover, as described further below, the FGM sealants also provide enhanced antimicrobial capacity (up to 55% reduction of *E. coli*) to reduce or prevent biofouling.

Turning to the synthesis of the FGMs, the GO or CG is first prepared and thereafter, the adhesive is covalently attached to the graphene scaffold. Following is a detailed description of the synthesis steps used to generate an FGM prepared from GO and an FGM prepared from CG.

Figure 2:
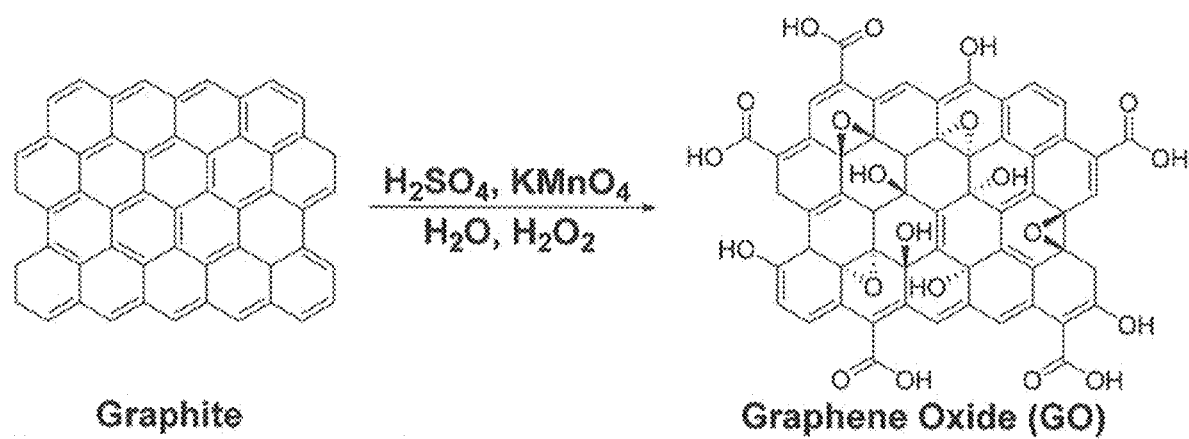
FIG. 2 illustrates the synthesis of a GO according to one embodiment of the invention.

FIG. 2 illustrates the synthesis of a GO according to one embodiment of the invention. As shown, GOs can be prepared via a modified Hummers' method by oxidizing graphite with potassium permanganate ($KMnO_4$). Hummers, W. S.; Offeman, R. E., *Preparation of Graphitic Oxide*, J. Am. Chem. Soc. 1958, 80 (6), 1339-1339, https://doi.org/10.1021/ja01539a017 and Holt, B. D.; Arnold, A. M.; Sydlik, S. A., *In It for the Long Haul: The Cytocompatibility of Aged Graphene Oxide and Its Degradation Products*, Adv.

Healthcare Mater, 2016, 5 (23), 3056-3066 https://doi.org/10.1002/adhm.201600745 are hereby incorporated by reference herein.

As an example, four different GOs with varying $KMnO_4$-to-graphite ratios (1:1, 2:1, 3:1, and 4:1) were synthesized. Specifically, four different batches of GO were prepared by varying the potassium permanganate ($KMnO_4$)-to-graphite ratio by weight in a 1:1, 2:1, 3:1, and 4:1 w/w ratio. Each reaction was run by dispersing 5 g of graphite flakes (graphite flake, natural,−325 mesh, 99.8% metal basis; Alfa Aesar, Ward Hill, Mass., USA) with 125 mL of concentrated sulfuric acid (Fisher Scientific, Pittsburgh, Pa., USA) in a 1 L Erlenmeyer flask. The mixtures were stirred and cooled over ice. Then, $KMnO_4$ (Sigma-Aldrich, St. Louis, Mo., USA) was slowly added over 20-30 min. The mass of $KMnO_4$ added to each reaction was either 5 g, 10 g, 15 g, or 20 g to generate GO 1:1, GO 2:1, GO 3:1, and GO 4:1, respectively. The ice baths were removed, and the reactions allowed to warm to room temperature and stirred for 2 h. Then, the reactions were gently heated to 35° C. and stirred for an additional 2 h. The heat was removed, and the GO reactions were quenched by slowly adding 700 mL of deionized (DI) water, 10 mL of 30% $H_2O_2$ (Fisher Scientific), and then 225 mL of DI water. Lastly, the reactions were stirred overnight.

To purify the GO reactions, they were vacuum filtered through a Buchner funnel. The pucks were carefully removed from the funnel without scraping the filter paper and loaded into 3500 molecular weight cutoff dialysis tubing (SNAKESKIN dialysis tubing, Thermo Scientific, Waltham, Mass., USA). The reactions were dialyzed against DI water for 3-7 days. The DI water was changed twice the first day and then once a day until clear. Then, the GO batches were frozen to −80° C. and lyophilized for 3-5 days until dry.

Figure 3:
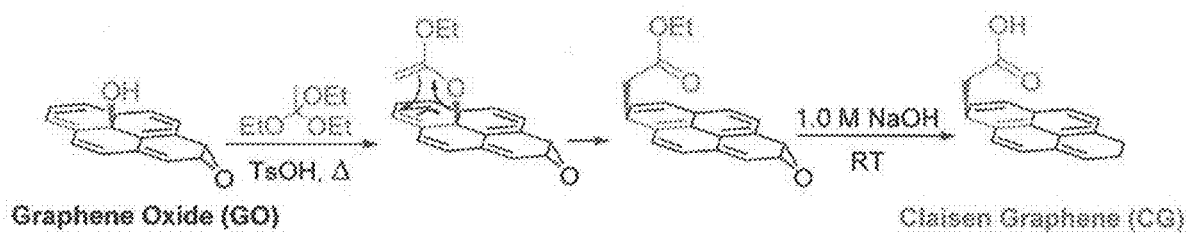
FIG. 3 illustrates the synthesis of a CG according to one embodiment of the invention.

FIG. 3 illustrates the synthesis of a CG according to one embodiment of the invention. As shown, CG is transformed from GO through the Johnson-Claisen rearrangement that installs hydrolytically stable C—C moieties on the basal plane using tertiary alcohols while simultaneously reducing the graphene backbone. The basal plane, tertiary alcohols on graphene oxide (GO) are transformed through a [3,3] sigmatropic rearrangement into esters separated from the scaffold with a two-carbon linker. Through saponification, these ester groups can be converted to carboxylic acids. See Sydlik, S. A.; Swager, T. M., *Functional Graphenic Materials Via a Johnson-Claisen Rearrangement*, Advanced Functional Materials 2013, 23 (15), 1873-1882, https://doi.org/10.1002/adfm.201201954 and Holt, B. D.; Arnold, A. M.; Sydlik, S. A., *Peptide-Functionalized Reduced Graphene Oxide as a Bioactive Mechanically Robust Tissue Regeneration Scaffold*, Polym. Int 2017, 66 (8), 1190-1198, https://doi.org/10.1002/pi.5375, which are hereby incorporated by reference herein.

As an example, CG was synthesized according to the Johnson-Claisen rearrangement and saponification. 1.23 g of GO (2:1 ratio) and 250 mL of triethyl orthoacetate (Alfa Aesar, Haverhill, Mass., USA) were added to a flame dried round bottom flask under nitrogen. The reaction was bath sonicated (240 W, 42 kHz ultrasonic cleaner, Kendal) for 10 min. Then, 21 mg of p-toluene sulfonic acid was added, and the reaction was refluxed (142° C.) under nitrogen for 36 h. The heat was removed and 50 mL of 1.0 M NaOH (in ethanol) was added during the cooling process at 85° C. with rapid stirring. When the reaction reached room temperature, it was stirred for an additional 3 h. CG was centrifuged at 3600×g for 5 min and the supernatant discarded. The pellet was re-dispersed in DI water, centrifuged at 3600×g for 5 min, and the supernatant discarded. The pellet was washed 3 additional times with DI water and 2 times with acetone. The CG was then dried under vacuum for 24-48 h until dry.

Figure 4:
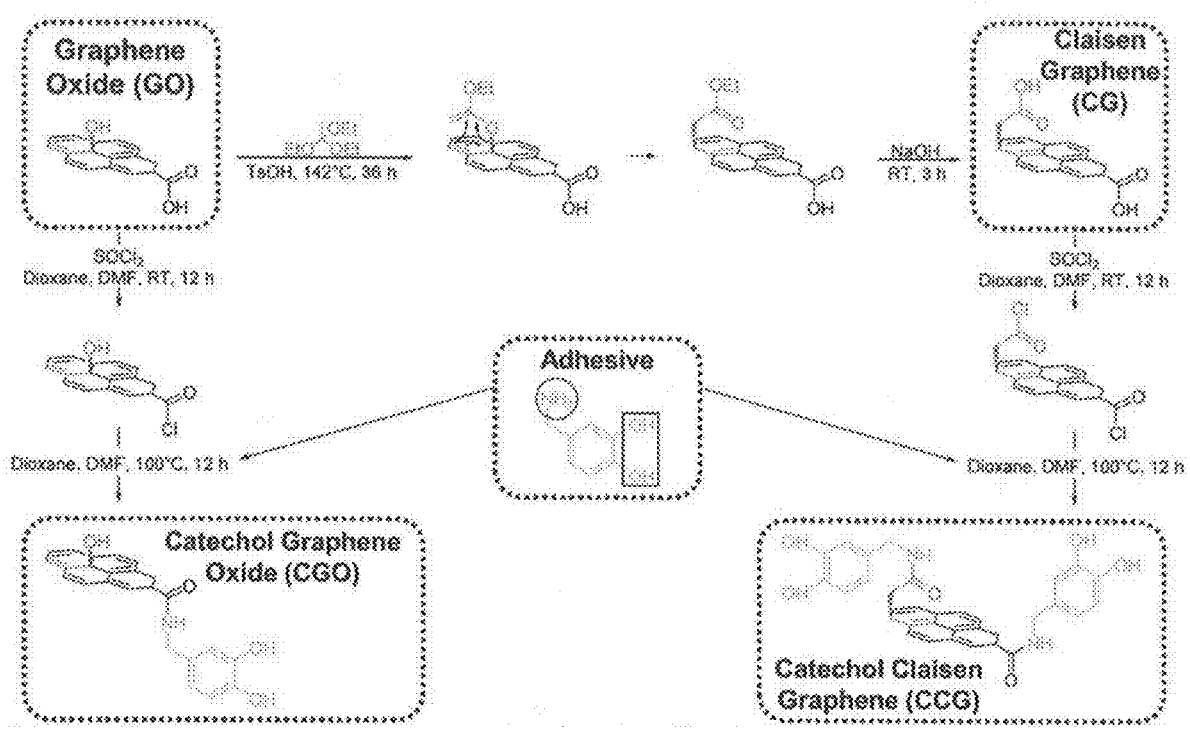
FIG. 4 illustrates the synthesis of FGMs from GO and CG according to one embodiment of the invention.

FIG. 4 illustrates the synthesis of FGMs from GO and CG according to one embodiment of the invention. As noted, the carboxylic acids on GO and CG were used as chemical handles to install a catechol derived adhesive. In one embodiment, the catechol molecule has a nucleophilic amine that is used to covalently attached to the GO or CG using thionyl chloride amidation. In other words, thionyl chloride amidation is used to covalently conjugate an amine-containing, small-molecule adhesive, such as a catechol-derivative adhesive, to GO or CG backbones to form the FGM. In this embodiment, the catechol molecule contains diols on the benzyl backbone that are pivotal for adhesion; thus, preserving the diol functionalities by selecting a catechol derivative that had an extra pendant group that could be used for covalent linkage. Accordingly, 3,4-dihydroxybenzylamine (DHBA) can be used as the catechol adhesive, as it contains the core catechol moiety and a pendant, primary amine: a strong nucleophile that can react with electrophilic carbons on graphenic substrates. As shown, the amine nucleophile and diol functional groups on the small-molecule adhesive (DHBA) are emphasized with a circle and box, respectively, and graphene sheets are represented as simplified pyrene structures for clarity.

As an example, five different formulations of FGM sealants were produced using GO 1:1, GO 2:1, GO 3:1, GO 4:1, and CG as the starting graphenic materials to produce catechol GOs (CGOs) and catechol CG (CCG). CGOs and CCG were prepared through an acyl chloride intermediate. See Functional Graphenic Materials Via a Johnson-Claisen Rearrangement cited above. Flame dried round bottom flasks under nitrogen were charged with 100 mg of graphenic material, 50 mL dry dioxane, and 5 drops of dimethylformamide. The mixtures were bath sonicated for 10 min, and then 0.7 mL of thionyl chloride (Sigma-Aldrich, St. Louis, Mo., USA) was slowly added dropwise. The reactions were stirred overnight at room temperature. Then, 250 mg of 3,4-dihydroxybenzylamine (DHBA) (Sigma-Aldrich, St. Louis, Mo., USA) was added. The reactions were heated to 100° C. and stirred overnight under nitrogen. The reactions were cooled to room temperature and centrifuged at 3600×g for 5 min and the supernatants discarded. The pellets were re-dispersed in dichloromethane and centrifuged at 3600×g for 5 min and the supernatants discarded. This was repeated 1 more time with dichloromethane, 2 times with DI water, and 2 times with acetone. The CGOs and CCG were then dried under vacuum for 24-48 h until dry.

Figure 5:
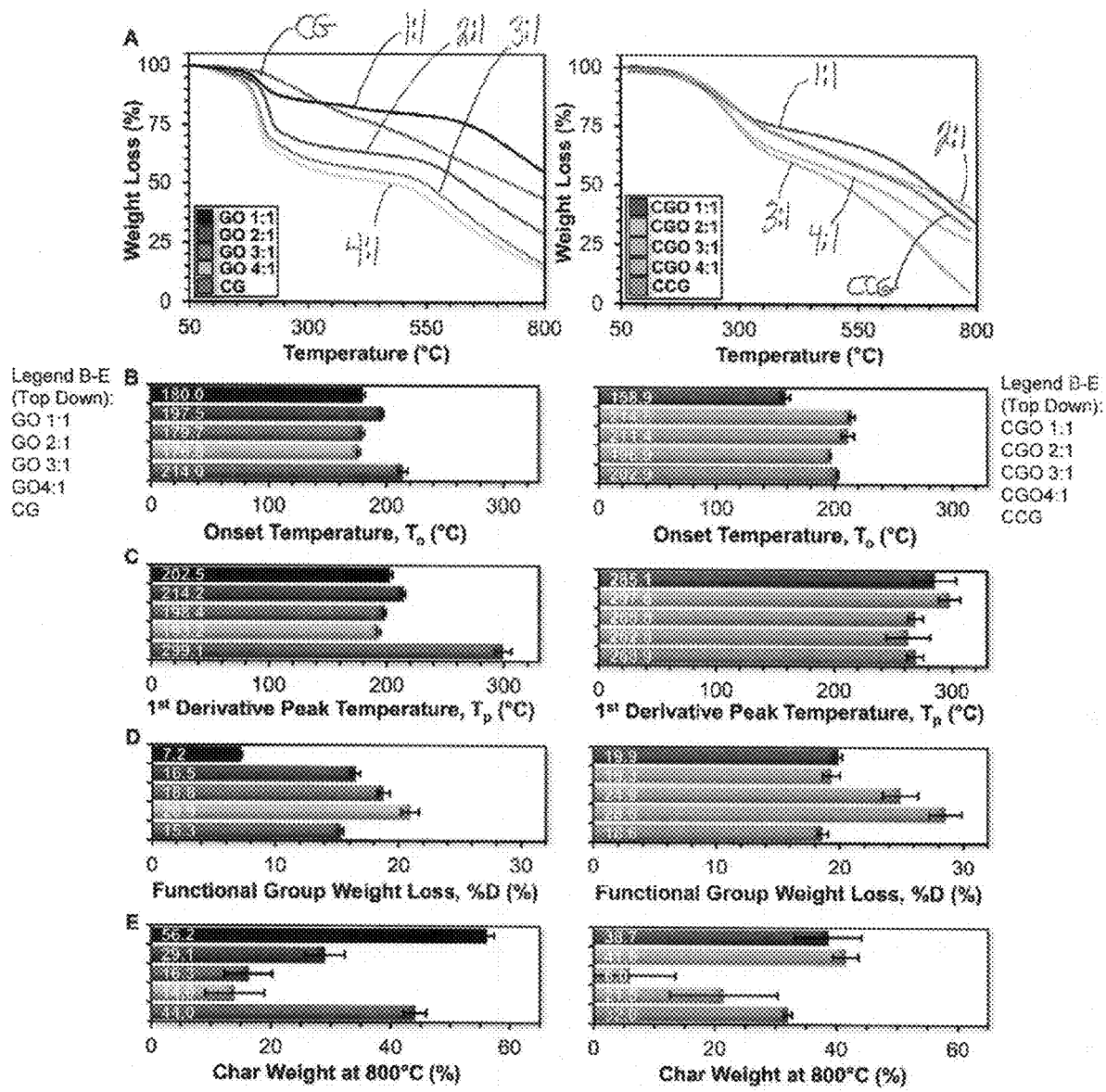
FIG. 5 illustrates the results of thermogravimetric analysis of the GOs, CG, and FGM generated according to one embodiment of the invention.

FIG. 5 illustrates the results of thermogravimetric analysis of the GO, CG, and FGM generated according to one embodiment of the invention. Thermogravimetric analysis (TGA) was performed on a PerkinElmer TGA 4000 under nitrogen (20 mL $min^{-1}$ flow rate) from 50-800° C. with a heating rate of 10° C. $min^{-1}$. The derivative of thermograms were smoothed with a simple moving average (step-size 50). Then, the data was analyzed in TRIOS software (TA Instruments) to determine the onset temperature (To), endset temperature (Te), first derivative peak temperature (Tp), weight loss percent (% D), and char weight percent. To and Te were determined from the thermogram using the onset and endset functions in Trios, respectively, using an average of 3 measurements. Tp was determined from the signal minimum of the first derivative of the thermogram. The % D was calculated as the area under the first derivative curve from the onset to the endset of the degradation event. Lastly, the char weight percent was determined from the remaining weight percent of material via the thermogram at 800° C.

The thermograms from this analysis as shown in FIG. 5, including thermograms of GOs, CG, and FGM sealants in the two graphs (A); and thermogravimetric analysis data obtained from the thermograms and the first derivative of the thermograms, including the onset temperature (To) in graphs B, the first derivative peak temperature (Tp) in graphs C, the functional group weight loss (% D) of the degradation event in graphs D, and the char weight percent at 800° C. in graph E. It should be appreciated that graphs A-E on the left side of FIG. 5 are for GOs and CG, and the graphs A-E on the right side of FIG. 5 are for the corresponding FGM. It should be appreciated that the bars in graphs B-E represent averages of n=3 separate TGA runs for each material and error bars are the standard deviation.

Figure 6:
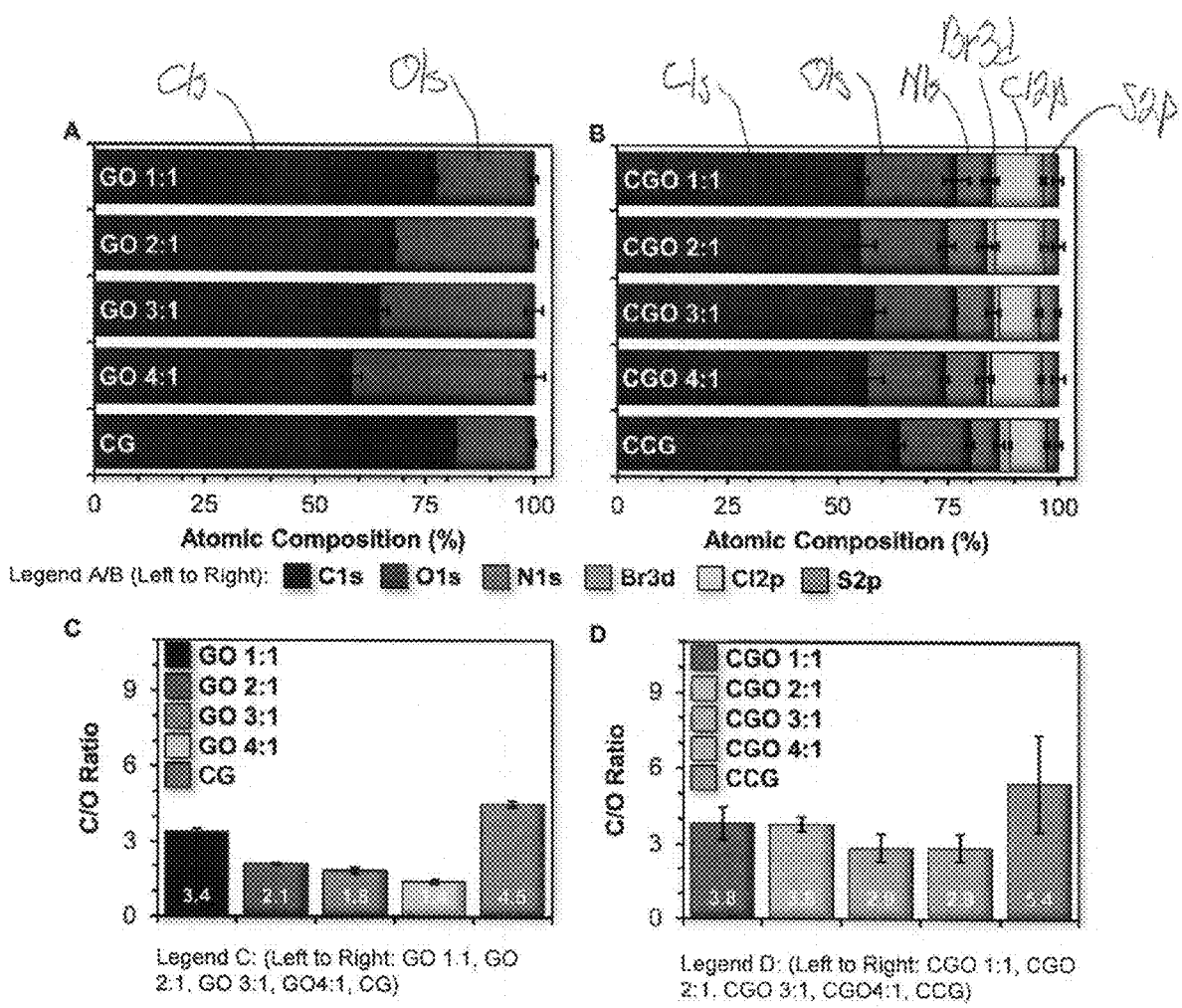
FIG. 6 illustrates the results of X-ray photoelectron spectroscopy (XPS) analysis of the GOs, CG, and FGM sealants generated according to one embodiment of the invention.

FIG. 6 illustrates the results of X-ray photoelectron spectroscopy (XPS) analysis of the GO, CG, and FGM generated according to one embodiment of the invention. XPS spectra were collected on a Thermo Fisher ESCALAB 250 Xi instrument with an Al K-Alpha source gun. Powdered samples were prepared by adhering on double sided copper tape for analysis. All spectra were collected using a 200 μm spot size. Survey scans (with 5 cumulative scans per spectra) were performed on 3 separate spot locations of the sample. Elemental quantification was performed in CasaXPS software (CasaXPS) using a smart baseline. The C1s, O1s, N1s, Br3d, S2p, and C12p emission peaks were used for quantification of carbon, oxygen, nitrogen, bromine, sulfur, and chlorine, respectively.

The quantification of C1s and O1s emission peaks were used to calculate the C/O ratio of GOs and CG. The C/O ratio of CGOs and CCG were more complicated due to the presence and incorporation of the DHBA catechol (which contributes to both carbon and oxygen atomic percent) and thionyl chloride impurities (which contribute to the oxygen atomic percent). Therefore, the atomic percent of carbon and oxygen required correction factors to eliminate the contributions from catechol derivatives and thionyl chloride, so carbon and oxygen atomic percentages solely reflect the graphenic backbone; this allows C/O ratios of CGOs and CCG to be directly compared to the unfunctionalized starting materials.

Since there are seven carbon atoms for every nitrogen atom in DHBA, the nitrogen atomic percent can be multiplied by a factor of seven and subtracted from the total carbon atomic percent in the material (Total Carbon At. %—7 (Nitrogen At. %)). The oxygen atomic percent required three corrections: 1) DHBA molecules that are not bound to GO scaffolds will introduce two oxygen atoms per molecule of DHBA. The atomic percent of unbound DHBA was approximated using the bromine atomic percent. 2) DHBA bound to GO scaffolds will add one oxygen atom per DHBA molecule. Bound DHBA was approximated by subtracting bromine (indicator of unbound DHBA) from the total nitrogen atomic percent. 3) It was assumed that sulfur and chlorine impurities resulted from unreacted thionyl chloride. Thionyl chloride impurities introduce one oxygen atom per molecule of thionyl chloride, where the sulfur atomic percent was used to determine the amount of thionyl chloride impurities. (Total Oxygen At. %-2 (Bromine At. %)-(Nitrogen At. %-Bromine At. %)-(Sulfur At. %)).

The resulting atomic compositions and C/O ratios are shown in FIG. 6, including the XPS of unfunctionalized scaffolds and FGM sealants. Elemental composition from survey scans of GOs and CG are shown in graph A, and elemental composition from survey scans of FGM sealants as shown in graph B. The carbon-to-oxygen (C/O) ratio obtained from elemental analysis for GOs and CG are shown in graph C, and the carbon-to-oxygen (C/O) ratio obtained from elemental analysis for CGOs and CCG are shown in graph D. Note that values for CGOs and CCG were obtained through a carbon and oxygen correction as described above to isolate the carbon and oxygen content present on the backbone of the scaffolds. It should be appreciated that the bars in graphs are averages of n=3, and error bars are the standard deviation.

The TGA and XPS were used to assess the degree of oxidation of GOs, CG, and FGM sealants. The results shown in FIGS. 5 and 6 illustrate that oxidation of GOs increases as the $KMnO_4$-to-graphite ratio increases, as demonstrated by an increase in functional group weight loss during degradation (% D) and an increase in the carbon-to-oxygen (C/O) ratio, respectively. Due to high temperature synthetic conditions, CG is the least oxidized material with a C/O ratio of 4.5. XPS also verified the degree of oxidation of FGM sealants is modestly reduced after thionyl chloride amidation.

More specifically, the TGA reveals effective catechol (3,4-dihydroxybenzylamine, DHBA) conjugation and preservation of oxygen groups after synthesis of adhesive FGMs. With reference to FIG. 5, the first derivative peak temperatures (Tp) increase 70-83° C. and suggest that more robust bonds, such as amides, are present (except for CG, which already contains a robust C—C bond). The percent of functional group weight losses during degradation (% D) increase up to 13 wt. % after synthesis. Increases in Tp and % D imply DHBA was loaded onto FGM sealants. Further, there were no significant increases in the onset temperatures (To) of FGM sealants after conjugation, where oxygen groups on graphenic scaffolds begin to degrade between 159-214° C. This suggests oxygen is still present on the backbones of FGM sealants, thus, our synthetic approach does not completely reduce scaffolds.

With reference to FIG. 6, XPS elemental composition reveals the presence of catechol and the presence of impurities resulting from synthesis conditions. DHBA incorporation in the products is apparent from the nitrogen content after synthesis, which is a unique atom to DHBA. Elemental scans also show bromine, sulfur, and chlorine impurities. Bromine is a result of unreacted DHBA that was occluded in the material. However, nitrogen and bromine have a 1:1 molar ratio in DHBA, where bromine is displaced when the catechol is covalently tethered to the graphenic backbone. Since nitrogen At. %>bromine At. %, this implies that some of the nitrogen is covalently bound to FGM sealants. Further, sulfur and chlorine impurities likely arise from occlusion or side reactions of thionyl chloride.

Figure 7:
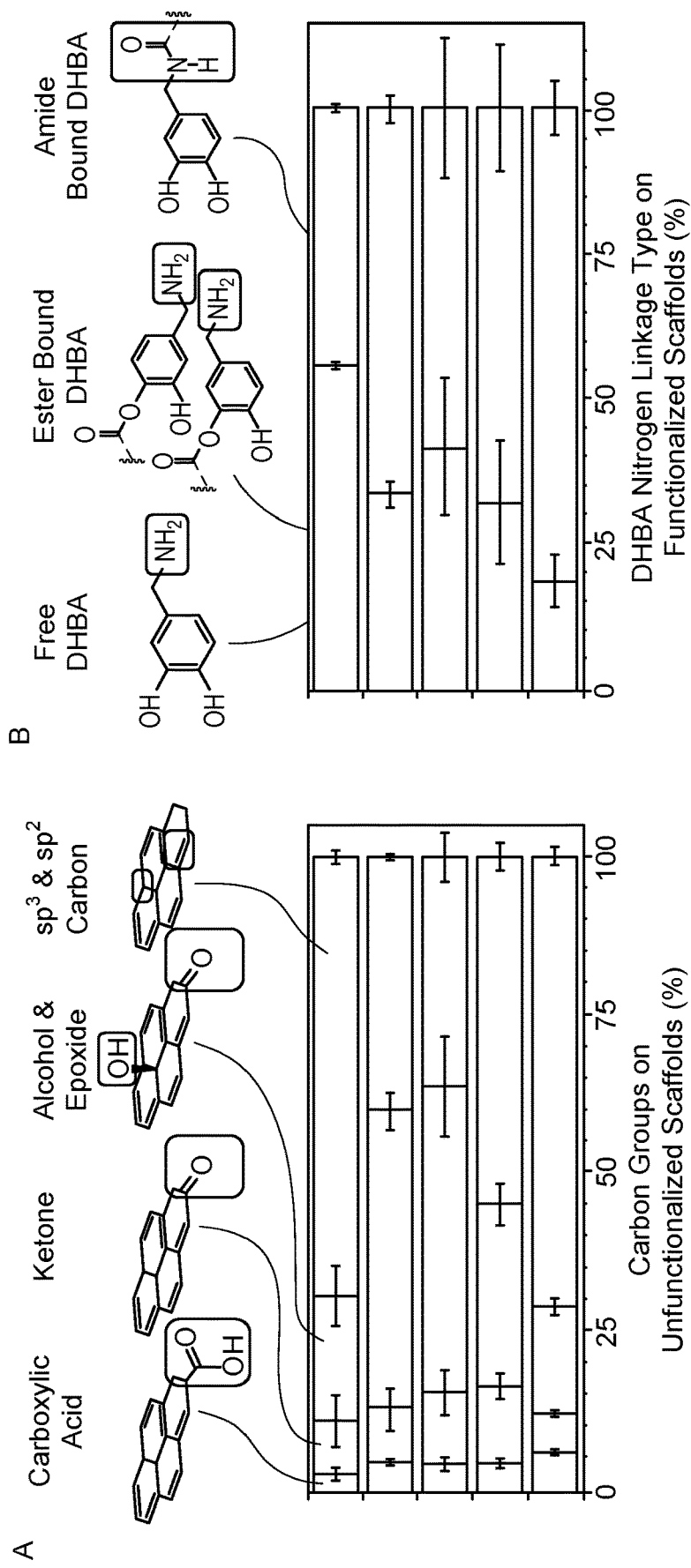
FIG. 7 illustrates chemical characterization of unfunctionalized GOs and CG scaffolds and FGM sealants using XPS according to one embodiment of the invention.
Figure 8:
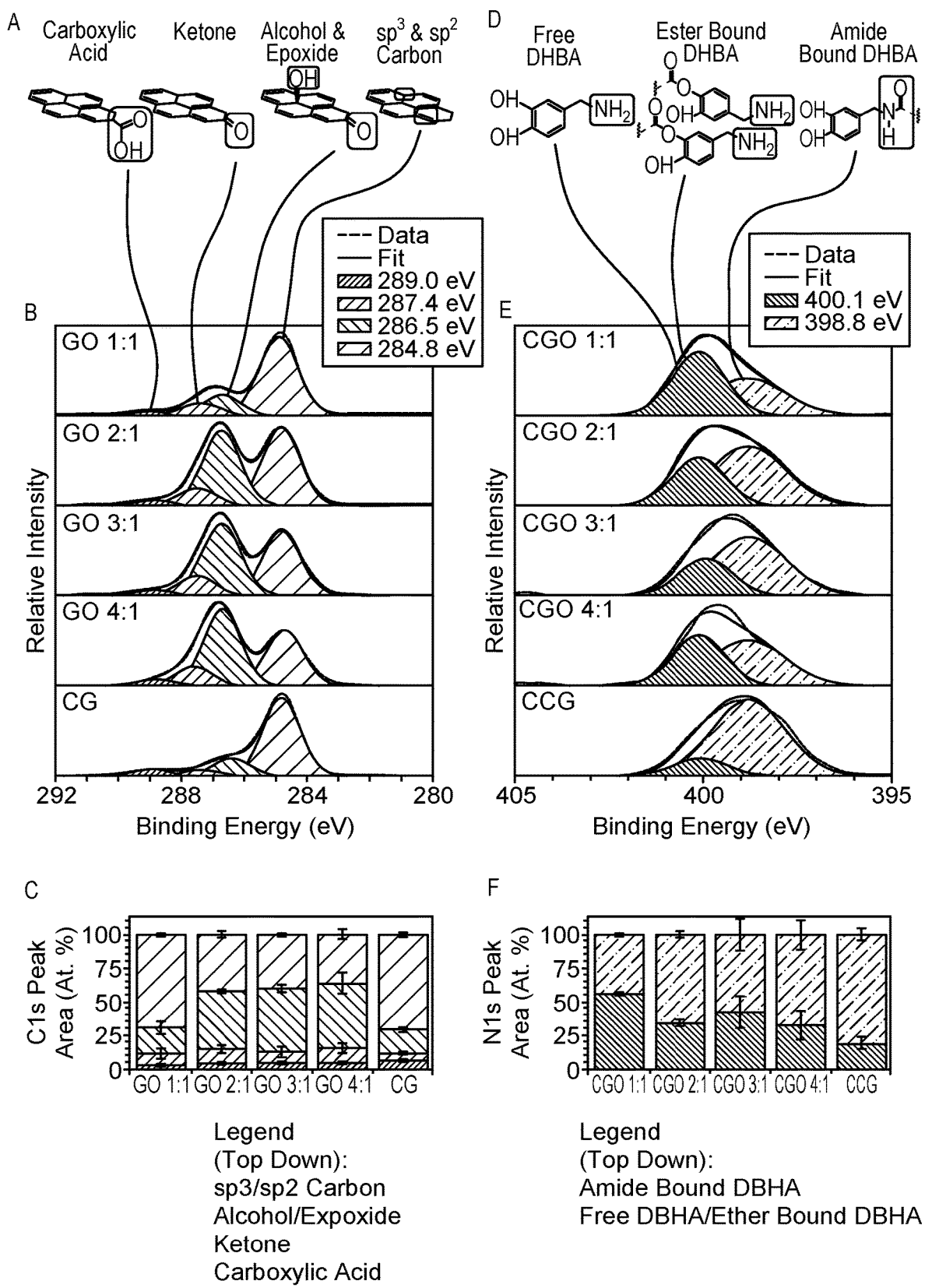
FIG. 8 illustrates high resolution XPS of unfunctionalized and catechol (3,4-dihydroxybenzylamine, DHBA) functionalized materials according to one embodiment of the invention.
Figure 9:
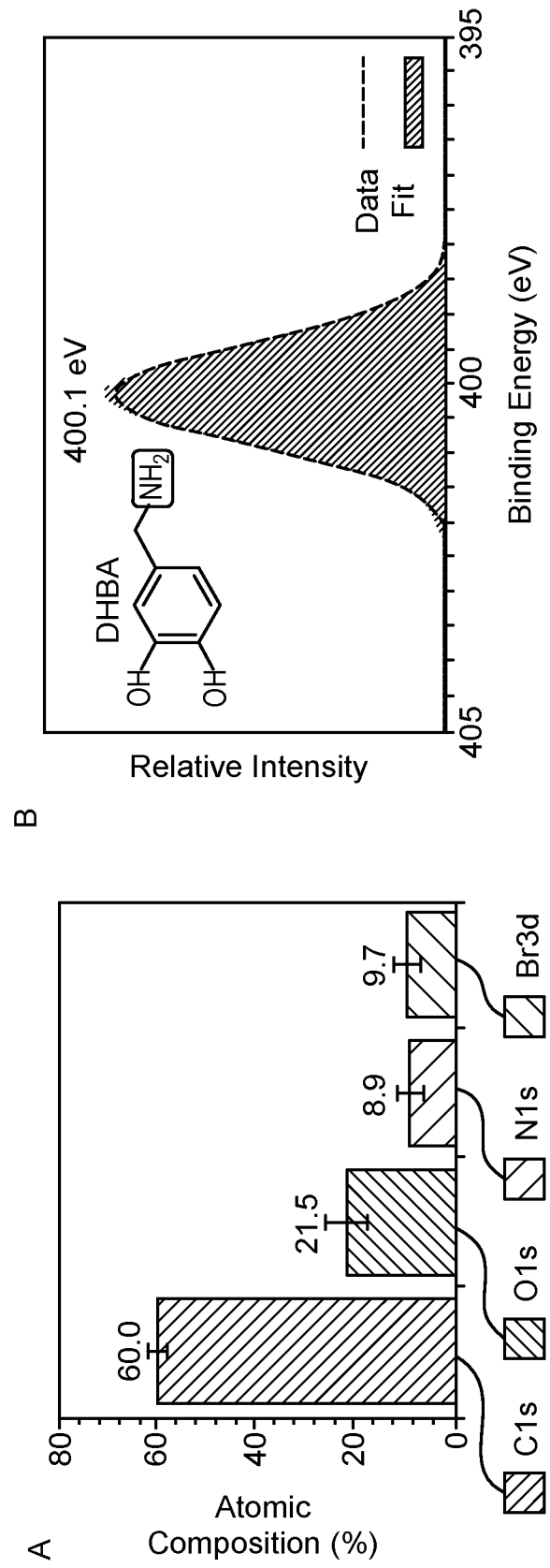
FIG. 9 illustrates the XPS of 3,4-dihydroxybenzylamine (DHBA) according to one embodiment of the invention.

FIG. 7 illustrates chemical characterization of unfunctionalized GO and CG scaffolds and FGM sealants using XPS according to one embodiment of the invention. FIG. 8 illustrates high resolution XPS of unfunctionalized and catechol (3,4-dihydroxybenzylamine, DHBA) functionalized materials. FIG. 9 illustrates the XPS of 3,4-dihydroxybenzylamine (DHBA) according to one embodiment of the invention.

High resolution scans of the C1s spectra (with 10 cumulative scans per spectra) were performed on 3 separate spot locations of the sample. Raw C1s spectra were smoothed in OriginPro (OriginLab) via the Savitzky-Golay method using a second-degree polynomial with a 15-point step-size. Then, a charge correction to adventitious carbon (284.8 eV) was applied to the C1s spectra and the data was truncated to 292-280 eV. Next, C1s spectra were Shirley baseline subtracted in Fityk software (Version 0.9.8) and deconvoluted using Gaussian peak fitting. Peak locations and full width at half maximum for all peaks were constrained to ±0.2 eV and 1.4 eV, respectively, for all graphenic materials.

High resolution N1s scans (with 25 cumulative scans per spectra) were also performed on 3 separate spot locations. Raw N1s spectra were smoothed in OriginPro using the Savitzky-Golay method (second-degree polynomial) with a 25-point step-size. The data was then truncated to 405-395 eV and processed in Fityk. The Shirley background was removed and N1s spectra were deconvoluted using Gaussian peak fitting. The amine peak location (400.1 eV) and full width at half maximum (1.64 eV) were determined using DHBA as a standard (see FIG. 9 showing the XPS of 3,4-dihydroxybenzylamine (DHBA), including the XPS survey scans in graph A and the XPS high resolution N1s spectra in graph B and noting that bars in graph A are the average of n=3 and error bars are the standard deviation). A new peak emerged in N1s spectra for FGM sealants indicative of an amide with a peak location of 398.8 eV and a full width at half maximum of 2.30 eV.

The representative carbon functional groups and nitrogen linkages are shown in FIG. 7, including the representative carbon function groups on unfunctionalized scaffolds identified using high resolution carbon (C1s) spectra as shown in graph A and representative nitrogen linkages 3,4-dihydroxybenzylamine (DHBA) present in FGM sealants, which were identified using high resolution nitrogen (N1s) spectra, as shown in graph B. Nitrogen content is not present in the unfunctionalized scaffolds since it is a unique element introduced by the presence DHBA. Thus, deconvolution of nitrogen spectra provide insight into the types of DHBA nitrogen linkages in FGM sealants. That is, the amount of DHBA that contribute (amide bound DHBA) and do not contribute (free+ester bound DHBA) to the adhesive properties of FGM sealants can be quantified. It should be appreciated that bars represent the mean of n=3 XPS measurements at different spot locations for each material and error bars are the standard deviation.

The high-resolution X-ray photoelectron spectroscopy (XPS) of unfunctionalized and catechol (3,4-dihydroxybenzylamine, DHBA) functionalized materials, including the C1s spectra and N1s spectra are shown in graph A-F, respectively, of FIG. 8. High resolution C1s spectra of GOs and CG where the functional groups present in the spectra are represented with simplified pyrene structures are shown in graph A. Peak deconvolution of the C1s spectra are shown in graph B, and quantification of the area under the curve from deconvoluted C1s spectra are shown in graph C. High resolution N1s spectra of catechol functionalized scaffolds, where the structure of the free, ester bound, and amide bound catechol (DHBA) on the graphenic backbones of FGM sealants are represented in graph D. The peak deconvolution of the N1s spectra are shown in graph E, and quantification of the area under the curve of deconvoluted N1s spectra are shown in graph F.

Further results are shown in Tables 1 and 2 below:

TABLE 1

Atomic Percentages of Carbon Functionalities in Unfunctionalized Graphene Materials Obtained from Deconvolution of C1s XPS Peaks.

| Area Under Curves (%) | O—C=O (289.0 eV) | C=O (287.4 eV) | C—O (286.5 eV) | C=C/C—C (284.8 eV) |
|---|---|---|---|---|
| GO 1:1 | 2.3 | 8.8 | 19.6 | 69.3 |
| GO 2:1 | 3.6 | 10.7 | 43.4 | 42.3 |

TABLE 1-continued

Atomic Percentages of Carbon Functionalities in Unfunctionalized Graphene Materials Obtained from Deconvolution of C1s XPS Peaks.

| Area Under Curves (%) | O—C=O (289.0 eV) | C=O (287.4 eV) | C—O (286.5 eV) | C=C/C—C (284.8 eV) |
|---|---|---|---|---|
| GO 3:1 | 4.1 | 8.6 | 47.2 | 40.1 |
| GO 4:1 | 4.0 | 11.3 | 48.4 | 36.3 |
| CG | 5.8 | 6.0 | 17.0 | 71.2 |

TABLE 2

Atomic Percentages of Nitrogen Linkages of Catechols to the Backbones of Functional Graphenic Material Sealants Obtained from Deconvolution of N1s XPS Peaks

| Area Under Curves (%) | Amide (398.8 eV) | Amine (400.1 eV) |
|---|---|---|
| CGO 1:1 | 44.1 | 55.9 |
| CGO 2:1 | 66.0 | 34.0 |
| CGO 3:1 | 58.1 | 41.9 |
| CGO 4:1 | 67.5 | 32.5 |

Deconvolution of high resolution XPS carbon (C1s) spectra shows that increasing oxidation of GOs increases carboxylic acids and basal plane oxygen groups. This method reveals that carboxylic acid content on GOs can be controlled by oxidation conditions until saturation is reached. Observation of saturation of carboxylic acids, but not of other functional groups, likely results from the fact that carboxylic acids are only installed on the edges of GO and oxidation of graphite into GO takes place from the edges to the center. Thus, at low $KMnO_4$-to-graphite ratios, oxidation is complete at the edges but minimal towards the interior since $KMnO_4$ is consumed before reaching the center of the sheets. CG had the highest carboxylic acid content because it does not suffer from the same limitations as GO because carboxylic acid functionalization occurs on the basal plane for CG. For GOs, basal plane functionalization with tertiary alcohols and epoxides contribute to higher oxidation after carboxylic acid saturation has been reached. Thus, oxidation can be used to control carboxylic acid content (which influences adhesion) and basal plane oxygen content of GOs (which influences cohesion).

Deconvolution of high resolution XPS nitrogen (N1s) spectra confirmed that CCG had the most DHBA bound to the backbone in the desired orientation for adhesion likely due to the reduced steric hindrance of carboxylic acids on CG. As noted above, the amine peak of DHBA was identified at 400.1 eV.

There was an emergence of a new peak at 398.8 eV in CGO and CCG materials, corresponding to an amide bond. Quantification of the nitrogen spectra enabled the quantitative determination of amide bound DBHA to FGM sealant scaffolds, where amide bound DHBA is the desired covalent linkage to promote adhesion. CGO 1:1 had the least amide bound DBHA. The rest of the CGOs had higher amounts of amide bound DHBA but were all similar. CCG had the highest amount of amide bound DHBA, indicating CG produced the most efficient functionalization.

Figure 10:
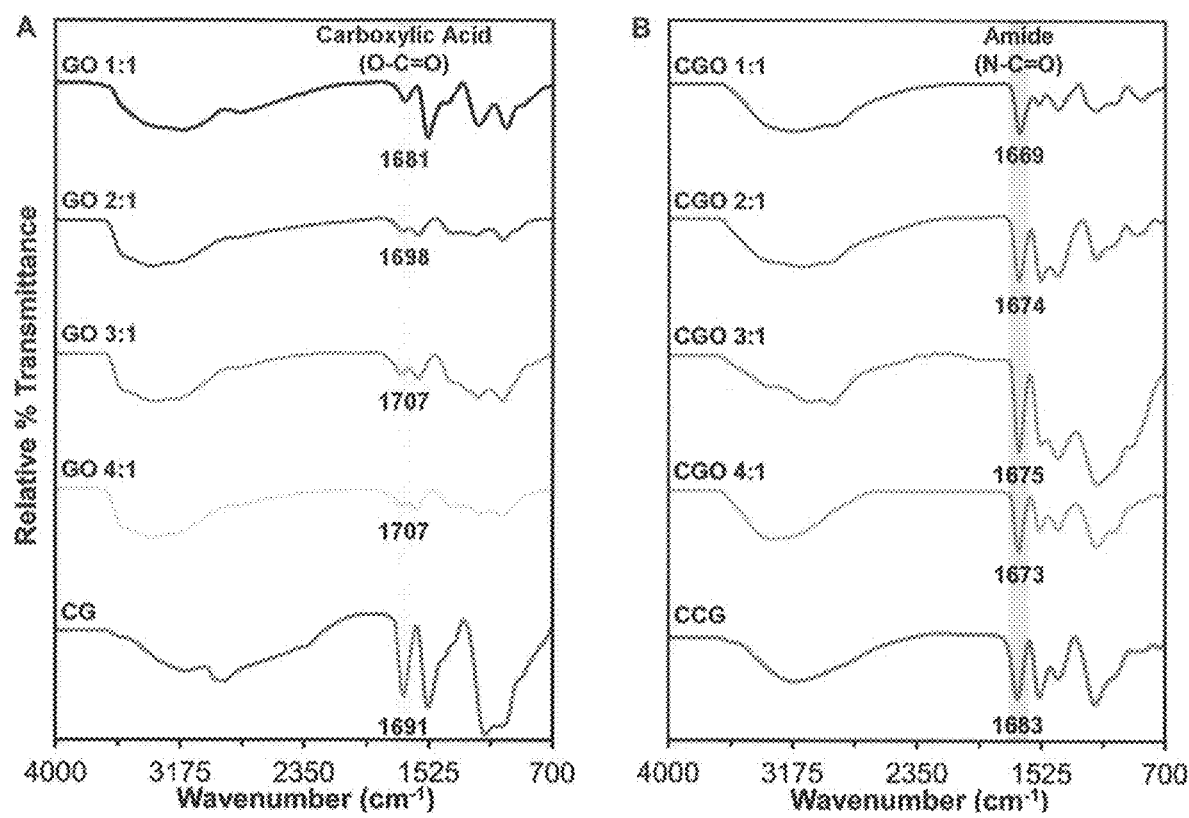
FIG. 10 illustrates Fourier transform infrared (FTIR) spectroscopy of GOs, CG), and FGM sealants according to one embodiment of the invention.

FIG. 10 illustrates Fourier transform infrared (FTIR) spectroscopy of GOs, CG), and FGM sealants according to one embodiment of the invention. FTIR spectra of powdered graphenic materials were collected on a PerkinElmer Frontier FT-IR Spectrometer with an attenuated total reflectance (ATR) attachment containing a germanium crystal. Raw spectra were recorded from 4000-700 $cm^{-1}$ with a 4 $cm^{-1}$ resolution. All spectra were ATR and baseline corrected using Spectrum software (PerkinElmer). Then, spectra were converted from percent transmittance to absorbance, and the hydroxyl stretches (3400-3200 $cm^{-1}$) were normalized to an absorbance of 0.1. Spectra were converted back into percent transmittance and offset for clarity. The resulting spectra are shown in graphs A and B of FIG. 10, noting that the vertical bars in each of graph A and B represent carboxylic acid and amide stretches, respectively.

FTIR spectroscopy and TGA were used as qualitative tools to assess covalent attachment of DHBA to GOs and CG scaffolds (see also FIG. 5). FTIR spectroscopy demonstrates covalent DHBA loading and the utilization of all carboxylic acids. The carboxylic acid peaks at 1710-1680 $cm^{-1}$ completely dissipate while new peaks emerge corresponding to amide bonds at 1680-1630 $cm^{-1}$ in FGM sealants, where FGM sealants are specifically denoted as CGOs and CCG. Further, the complete disappearance of carboxylic acid bands suggests all reactive sites were utilized for tethering. TGA corroborated FTIR spectroscopy. Increases in the first derivative peak temperatures (Tp) and functional group weight losses during degradation (% D) suggest effective DHBA conjugation of FGM sealants.

Figure 11:
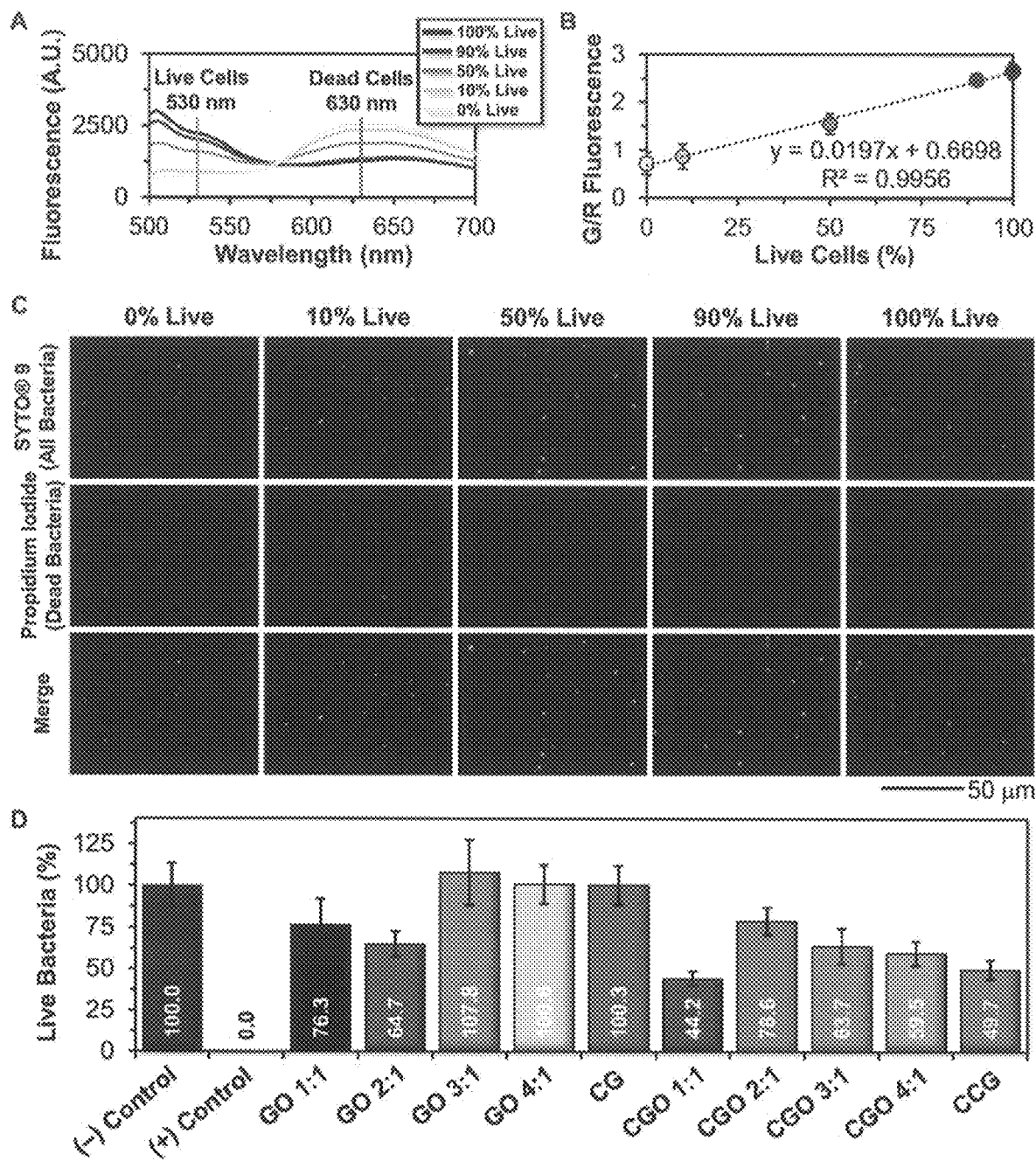
FIG. 11 illustrates antimicrobial capacity of unfunctionalized scaffolds and FGM sealants with *E. coli* in buffered media according to one embodiment of the invention.

FIG. 11 illustrates antimicrobial capacity of unfunctionalized scaffolds and FGM sealants with *E. coli* in buffered media according to one embodiment of the invention. Specifically, the fluorescence emission of standards prepared with the LIVE/DEAD® BACLIGHT™ assay are shown in graph A. The calibration curve generated from the ratio of green (530 nm) to red (630 nm) fluorescence peak intensities is shown in graph B. The fluorescence microscopy images of the calibration curve are shown in the images in C. The percent of live bacteria determined in experimental samples, where the negative control was not treated with any material and the positive control was treated with penicillin/streptomycin, are shown in graph D.

All reagents and samples were handled using aseptic techniques to prevent contamination. Buffered media was prepared by dissolving 12.5 g of LB Miller Broth (Fisher BIOREAGENTS™, USA) and 0.75 g of Tris HCl (Promega, Madison, Wis., USA) in 500 mL of deionized water, reaching final broth component concentrations of 10 g $L^{-1}$ tryptone, 10 g $L^{-1}$ NaCl, and 5 g $L^{-1}$ yeast extract. Media was autoclaved at 121° C. for 1 h and cooled to room temperature before use. *Escherichia coli* (*E. coli*) strain K12 were purchased from ATCC (ATCC® 25404™). Cultures were maintained in 5 mL of media in a 15 mL centrifuge tube with a loosened cap, on a rotating shaker (MINIMIXER™, Benchmark Scientific, Sayreville, N.J., USA) at 37° C. (MyTemp Mini Digital Incubator, Benchmark Scientific) and incubated for 16 h. Then, bacteria were pelleted by centrifugation at 10000× g for 15 min, followed by aspiration of the supernatant and resuspension of the pellet in 5 mL of fresh media. Cultures were then used for experiments in a 1:4 split ratio with fresh media (1 mL stock cell suspension in 4 mL fresh media). Graphenic stock materials were weighed into 20 mL glass scintillation vials and irradiated with 254 nm ultraviolet light for 5 min for sterilization. Powders were dispersed in media (sterilized, buffered LB Miller Broth) to a final concentration of 5 mg $mL^{-1}$. Graphenic stock dispersions were then briefly sonicated to disrupt flocculants.

A negative control, positive control, and graphenic samples were prepared and added to the interior wells of a 96-well cell culture plate. All samples contained 4% v/v *E. coli* from the cell stock. The negative control was not treated (only contained *E. coli* and media) while the positive control was dosed with Penicillin/Streptomycin diluted to 100 U $mL^{-1}$ (ThermoFisher Scientific). The graphenic samples were prepared by dosing *E. coli* with graphenic stock dispersions (5 mg $mL^{-1}$) to a final concentration of 1 mg $mL^{-1}$. Finally, each sample was diluted with media to a final concentration of 250 μL per well. Then, the 96-well cell culture plate (with cell culture plate lid) was incubated at 37° C. on a rotational shaker for 16 h followed by cell analysis with the LIVE/DEAD® BACLIGHT™ assay according to the manufacturer's protocol. All samples were run in triplicate. An additional negative control was run to generate a calibration curve with the LIVE/DEAD® BACLIGHT™ Bacterial Viability Kit (ThermoFisher Scientific, Waltham, Mass., USA).

After performing the LIVE/DEAD® BACLIGHT™ assay, fluorescence data of the experimental samples (calibration curve, negative controls, positive controls, and graphenic samples) in the 96-well cell culture plate was acquired on a SPARK® plate reader (Tecan) with SPARK-CONTROL™ v2.2 software. Fluorescence was measured with a 470 nm excitation wavelength and a bandwidth of 10 nm. A fluorescence emission spectrum from 500-700 nm was collected with a bandwidth of 10 nm and 5 nm step size. Fluorescence microscopy samples were prepared by depositing 10 μL, of stained bacterial samples onto a #1.5 coverslip that was suspended across the microscope objective using the stage insert. Fluorescence microscopy images were rapidly acquired before any evaporative effects using an EVOS® FL Auto Cell Imaging System (ThermoFisher Scientific) with a 100×, 1.40 numerical aperture, oil-immersion objective.

Antimicrobial capacity can be an important aspect of in-situ sealants, for example, those used to mitigate additional damage to the condenser tube defect site caused by microbial colonization and biofilm formation. As shown, all graphenic materials containing conjugated catechol (FGM sealants) were antimicrobial. CGOs and CCG reduced the percentage of live *E. coli* cells by up to 55%. Unfunctionalized GO 3:1, GO 4:1, and CG had no effect, and GO 1:1 and GO 2:1 had modest effects. The catechol moiety and impurities in sealant formulations may be responsible for the enhanced bactericidal properties. Chlorine, which was identified as an impurity in XPS spectra (see FIG. 6), is also an excellent antimicrobial agent.

Figure 12:
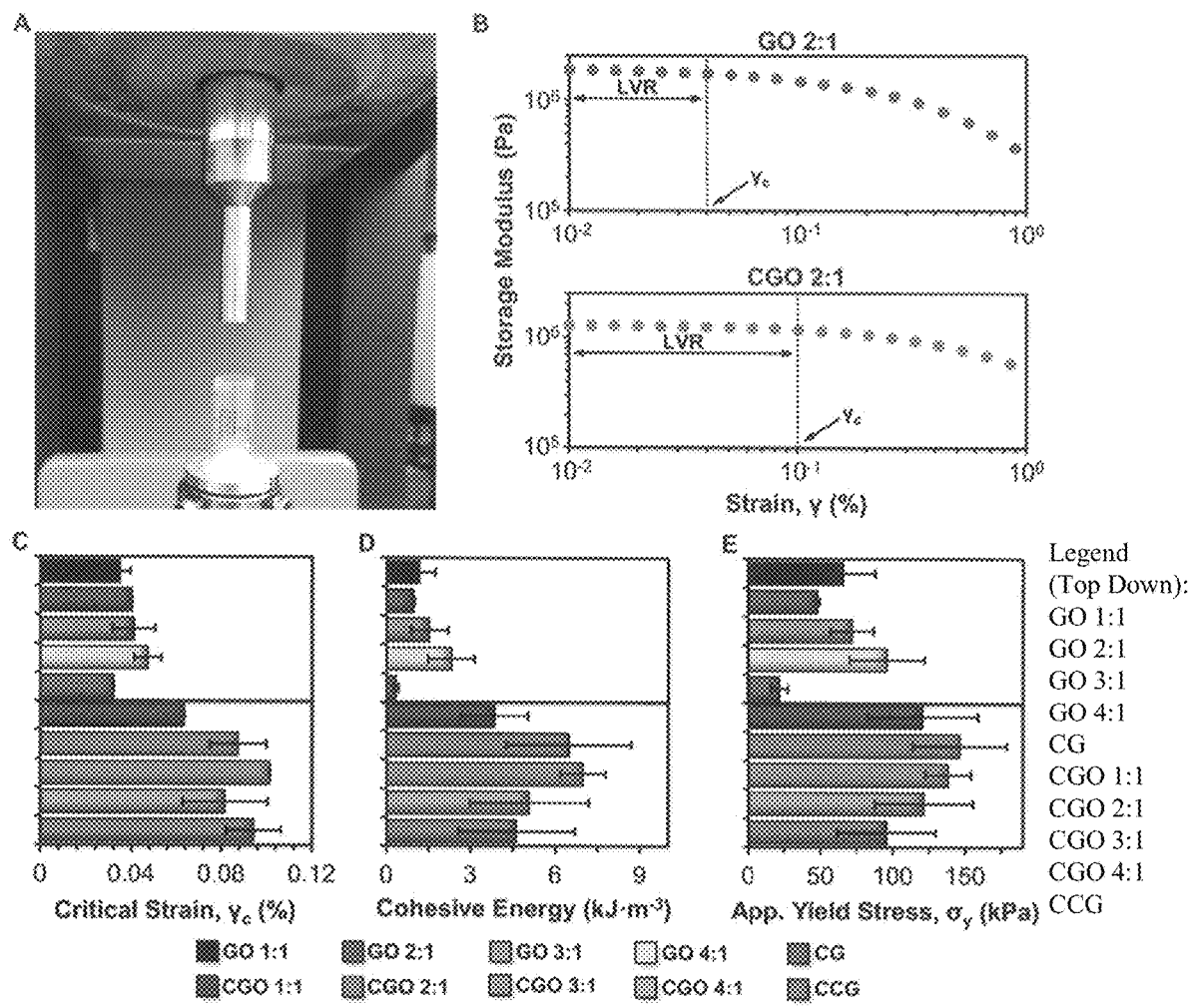
FIG. 12 illustrates dynamic mechanical analysis of hydrated graphenic pucks measured in compression and torsion according to one embodiment of the invention.
Figure 13:
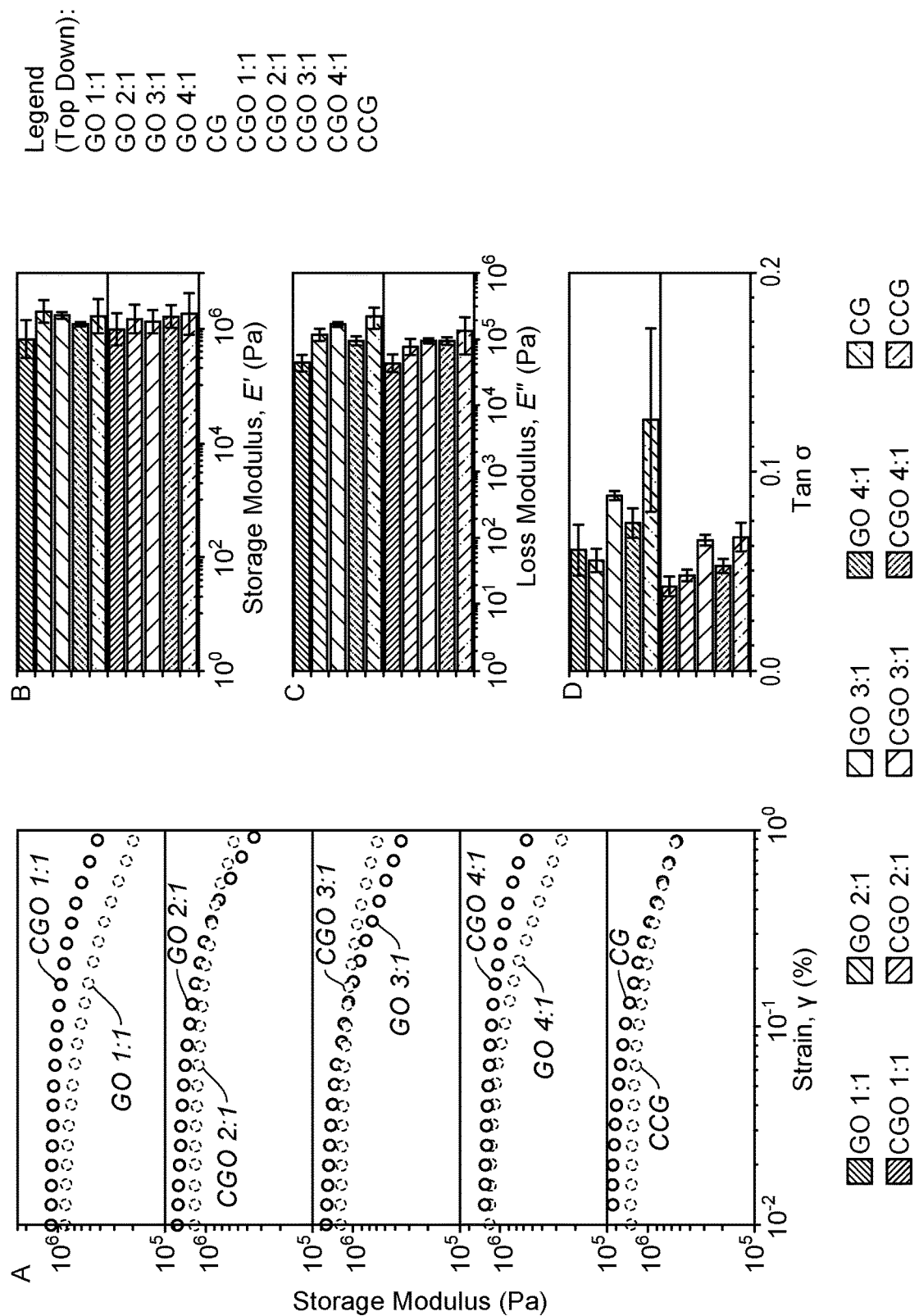
FIG. 13 also illustrates dynamic mechanical analysis of hydrated graphenic pucks measured in compression and torsion according to one embodiment of the invention.

FIG. 12 illustrates dynamic mechanical analysis of hydrated graphenic pucks measured in compression and torsion according to one embodiment of the invention. FIG. 13 also illustrates dynamic mechanical analysis of hydrated graphenic pucks measured in compression and torsion according to one embodiment of the invention. These results were obtained by various tests. Dynamic mechanical analysis (DMA) was performed on a Discovery Hybrid Rheometer HR-2 (TA Instruments, New Castle, Del.). A 1 N pre-force was applied (and maintained) throughout the course of all mechanical testing. All testing was performed using a sanded, 25 mm aluminum plate as the bottom geometry and an 8 mm steel (sandblasted) upper geometry. A 3 mL polypropylene syringe barrel was cut into a 2-inch-long cylinder and secured onto the center of the bottom geometry using epoxy glue. The epoxy glue was administered on the outside of the polypropylene syringe and bottom geometry. Application of the epoxy glue was administered with care to prevent material from coating the bottom geometry on the inside of the polypropylene syringe tube, which could lead to an uneven testing surface that could introduce artifacts. The epoxy was allowed to dry for 15 min and then high-vacuum silicon grease (DOW CORNING®) was used to completely seal the syringe to the bottom geometry (again, by applying the silicon grease to the outside of the polypropylene syringe tube in the same manner as the epoxy glue). Then, ~30 mg of graphenic powder was added to the syringe followed by the addition of 1 mL of DI water. After 15 min, the graphenic materials had settled onto the bottom of the syringe setup in a puck-like mass for mechanical testing, where pucks were 0.6-1.2 mm in thickness.

Amplitude sweeps in torsional shear were carried out at 1 Hz from 0.01-50% strain. The linear viscoelastic region (LVR) and critical strain ($\gamma_c$) were determined from the amplitude sweeps according to ASTM D7175.6. That is, the LVR and $\gamma_c$ were calculated using a ±10% deviation of the storage modulus (G') at a strain of 0.01%. The apparent yield stress ($\sigma_y$) was approximated from the following equation: $\sigma_y = \gamma_c \times G^*$, where $G^*$ is the complex modulus at 0.01% strain. TRIOS software was used to convert the raw amplitude sweep data into the complex modulus. The cohesive energy (CE) was determined with the following equation: $CE = \frac{1}{2} \times \gamma_c\ 2 \times G$, where G' is measured at 0.01% strain. All amplitude sweeps were conducted in triplicate for each material.

Turning to the results from the above tests, FIG. 12 illustrates an image of the empty test apparatus in image A. Representative amplitude sweeps are shown in graphs B. The critical strain ($\gamma_c$), cohesive energy, and apparent yield stress ($\sigma_y$) obtained from amplitude sweeps, where n=3, and error bars are standard deviation, are shown in graphs C, D, and E, respectively. FIG. 13 illustrates representative amplitude sweeps collected at 1 Hz in graphs A. The storage moduli (E'), loss moduli (E"), and tan δ, where all data was acquired at 1 Hz and a strain of 0.01% are shown in the graphs B-D, respectively, noting that the bars in the graphs are averages of n=3 and the error bars are the standard deviation.

Figure 14:
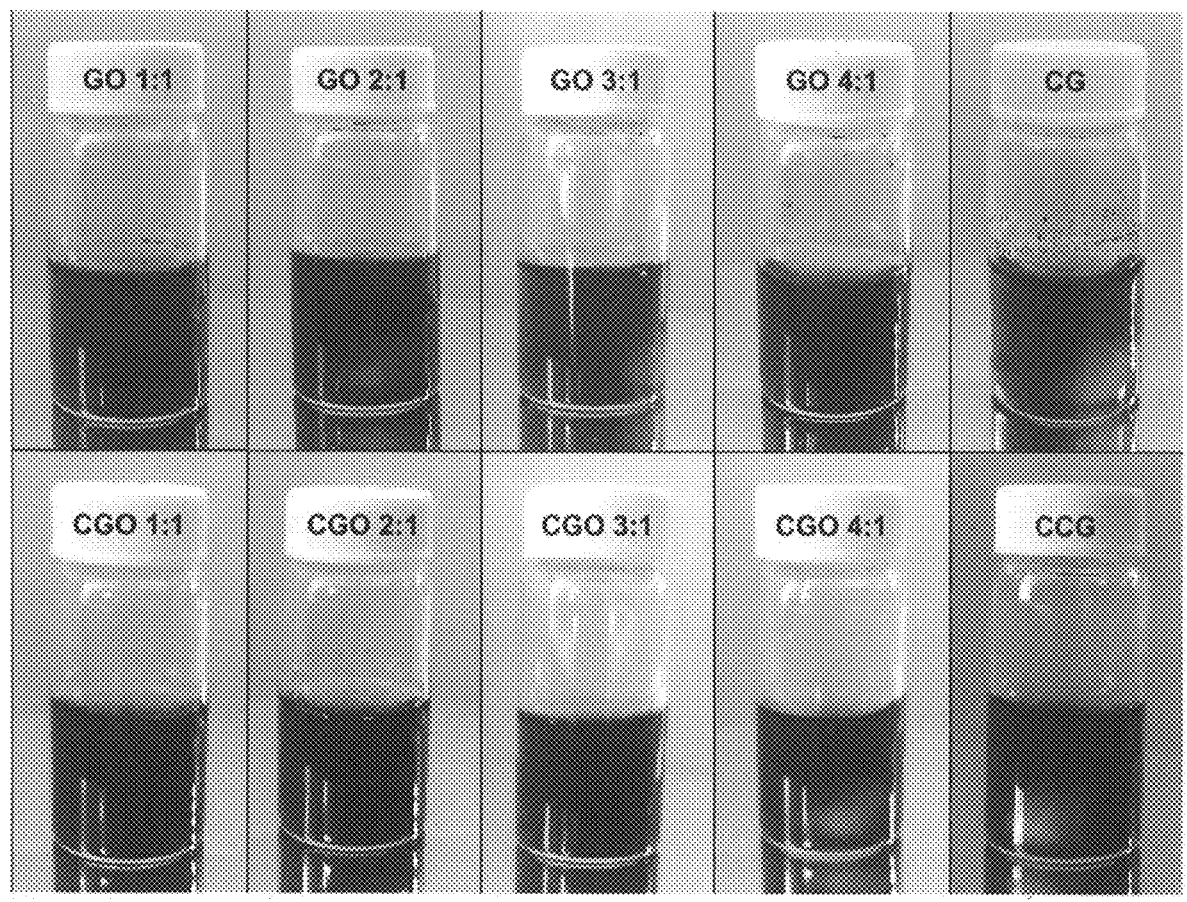
FIG. 14 illustrates images of graphenic dispersions in water according to one embodiment of the present invention.
Figure 15:
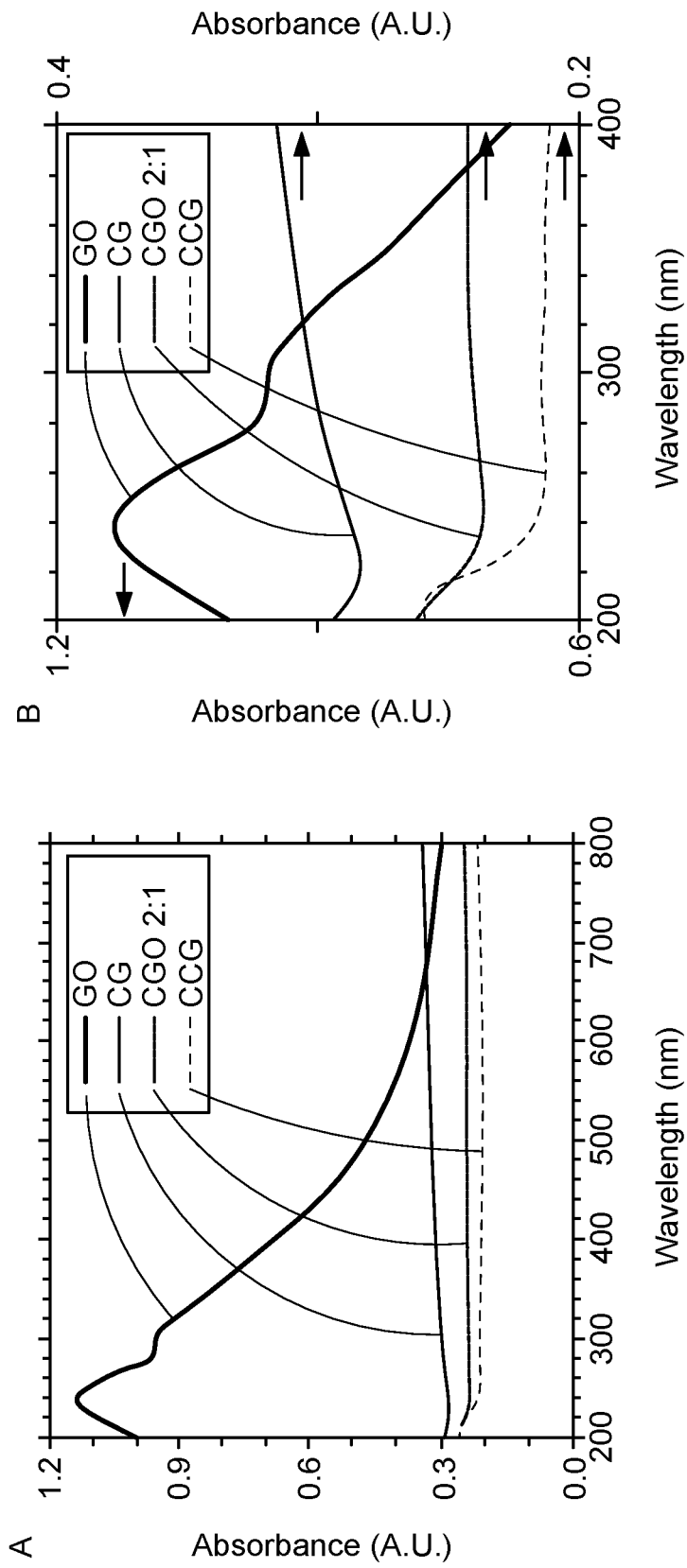
FIG. 15 illustrates absorption spectroscopy of aqueous dispersions of graphenic materials according to one embodiment of the invention.
Figure 16:
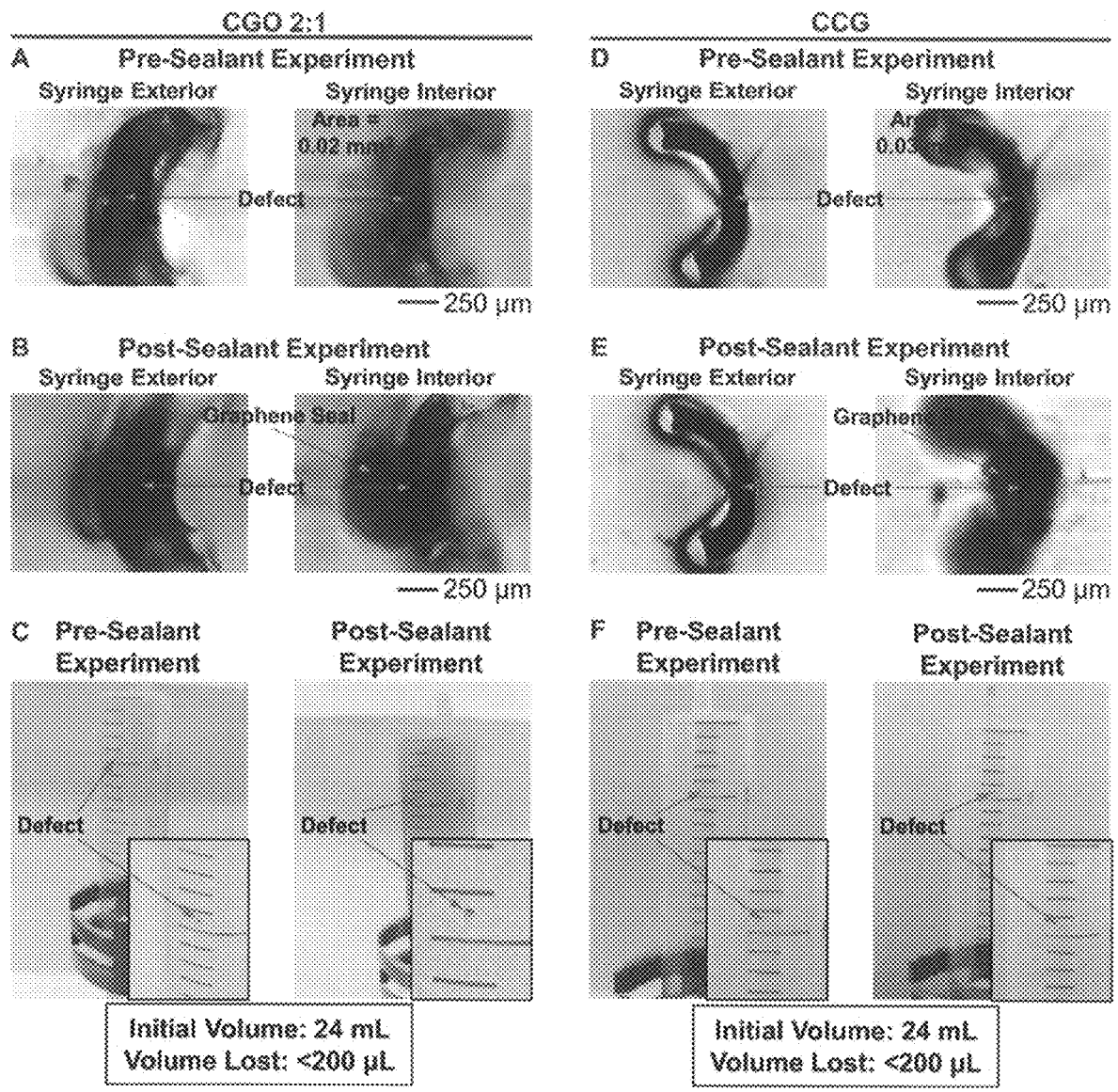
FIG. 16 illustrates the sealing capacity of graphenic dispersions in polypropylene syringes containing defects according to one embodiment of the invention.
Figure 17:
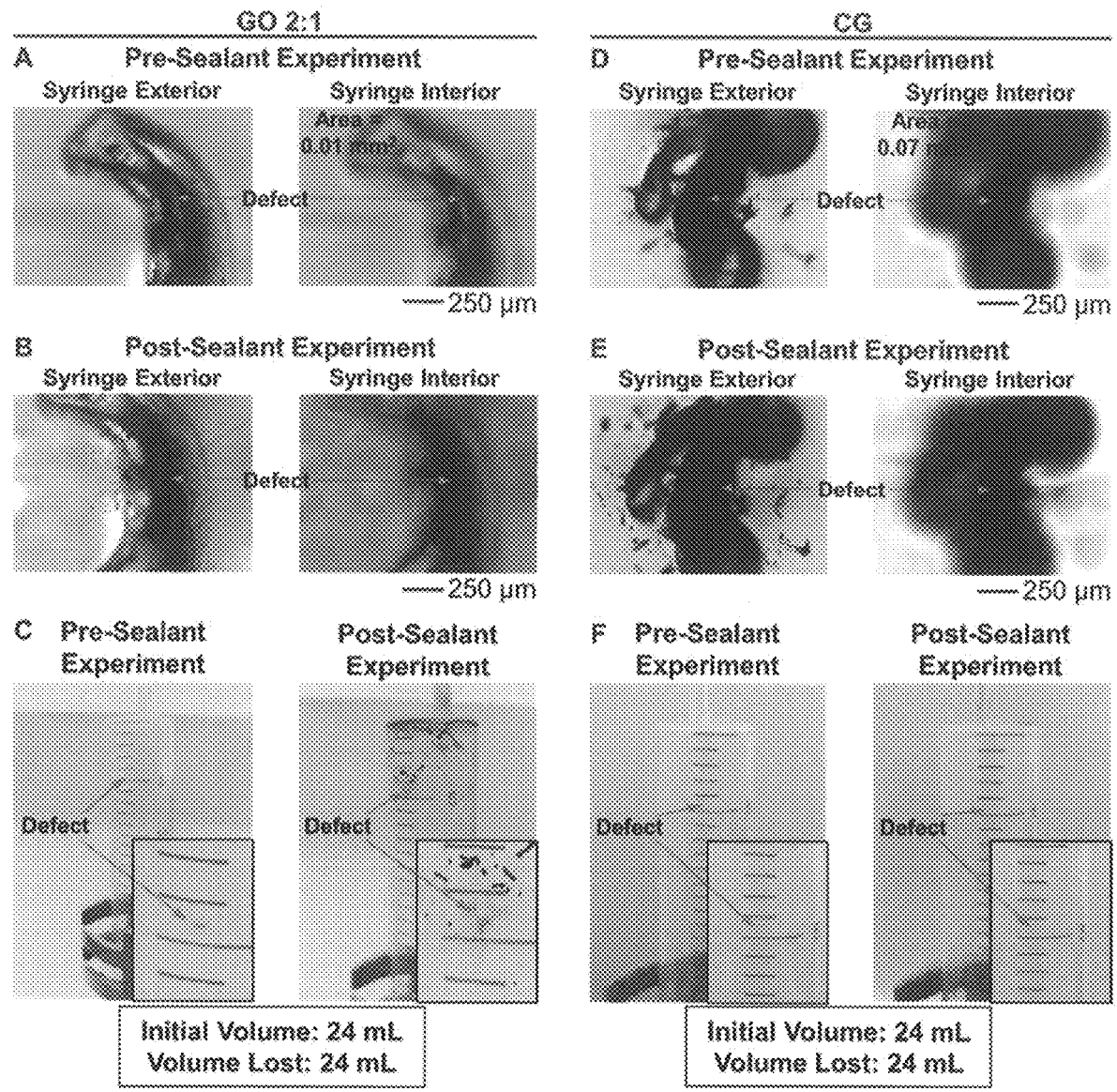
FIG. 17 also illustrates the sealing capacity of unfunctionalized graphenic dispersions in polypropylene syringes containing defects according to one embodiment of the invention.
Figure 18:
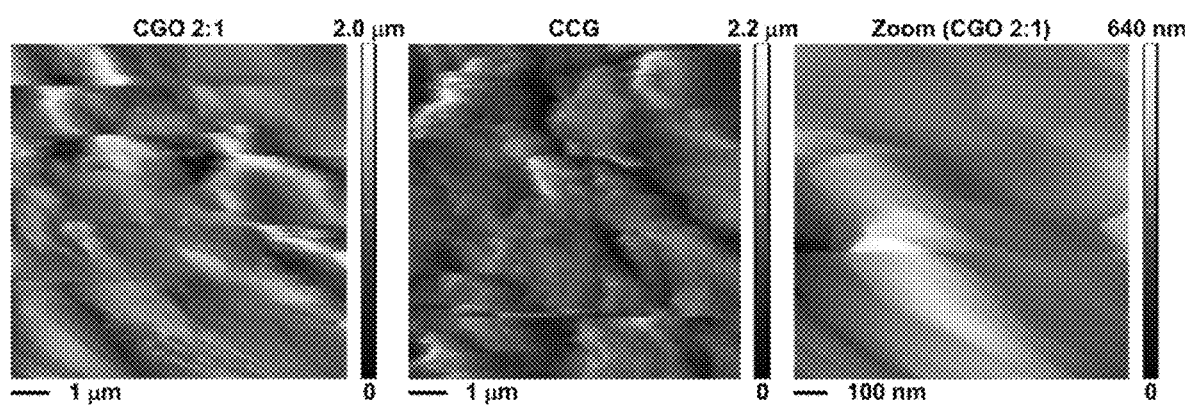
FIG. 18 illustrates the AFM images of FGM sealed defects extracted from syringes according to one embodiment of the invention.
Figure 19:
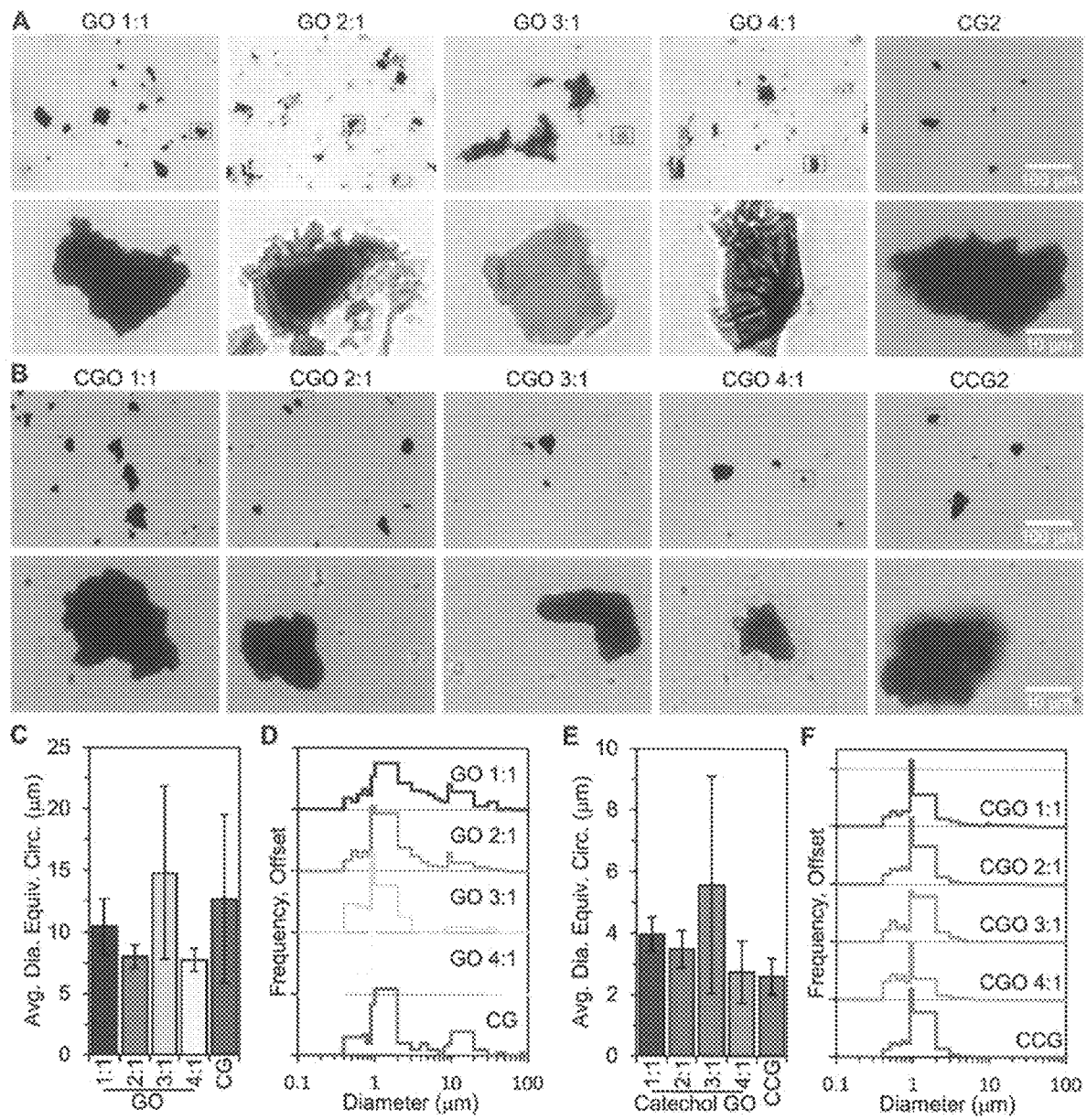
FIG. 19 illustrates optical microscopy images of the GOs, CG, and FGM according to one embodiment of the invention.

FIG. 14 illustrates images of graphenic dispersions in water according to one embodiment of the present invention according to one embodiment of the invention. FIG. 15 illustrates adsorption spectroscopy of aqueous dispersions of graphenic materials according to one embodiment of the invention. FIG. 16 illustrates the sealing capacity of graphenic dispersions in polypropylene syringes containing defects according to one embodiment of the invention. FIG. 17 also illustrates the sealing capacity of unfunctionalized graphenic dispersions in polypropylene syringes containing defects according to one embodiment of the invention. FIG. 18 illustrates the AFM images of FGM sealed defects extracted from syringes according to one embodiment of the invention. FIG. 19 illustrates atomic force microscopy (AFM) images of an FGM sealed defect according to one embodiment of the invention.

The results shown in FIGS. 14-19 were generated using various procedures. Adhesive properties characterizations were performed using graphenic dispersions in water (1 mg $mL^{-1}$), which were briefly bath-sonicated to disrupt macroscale flocculation. Dispersions were stirred at 120 revolutions per minute and images were acquired with a 16-megapixel camera. Absorption spectroscopy was used on powder samples that were diluted in DI water to 100 μg $mL^{-1}$, vortexed, and briefly sonicated (240 W, 42 kHz ultrasonic cleaner, Kendal) for <1 min. Samples were placed in 1 cm path length quartz cuvettes. Ultraviolet-visible absorption spectroscopy was performed using a Varian Cary 5000 spectrophotometer over wavelengths of 200:1:800 nm.

To test the sealing abilities of the FGMs, small defects were created in 20 mL polypropylene syringes by puncturing with the tip of an 18-gauge, hypodermic needle. Defects were tested with DI water to ensure complete penetration through the syringe wall. That is, the syringes were filled with 24 mL of DI water and then the DI water was forced through the syringe defect by sealing the syringe nozzle and compressing the plunger. After ensuring the defect that penetrated the entire wall of the syringe, bright field, monochrome imaging of the defect was performed on an EVOS® FL Auto Cell Imaging System with a 10×, 0.30 numerical aperture objective. Images of the entire syringe were also captured using a 16-megapixel camera. Graphenic water dispersions were prepared at a concentration of 350 μg $mL^{-1}$ and then bath-sonicated for 20 min to ensure that large flocculants were completely dispersed. Then, 24 mL of GO 2:1, CGO 2:1, CG, and CCG dispersions were loaded into syringes. The sealing abilities of the formulations were tested by forcing the graphenic dispersions through the syringe defect until it either sealed or was completely empty. This was accomplished by applying a force on the syringe plunger while simultaneously covering the syringe nozzle to prevent loss of liquid. After the experiment, the defects were imaged again using microscopy and photography. All data processing of acquired microscopy images was conducted in ImageJ (National Institutes of Health, Bethesda, Md.).

After the defects of syringes were successfully sealed with CGO 2:1 or CCG, the syringes were emptied, and the sections of syringe immediately around the sealed defects were carefully cut out. Atomic force microscopy (AFM) was then performed. The excised samples were mounted on the AFM stage. AFM imaging of the graphenic seals was performed on a NT-MDT SOLVER Nano atomic force microscope in semicontact mode using tips with a spring constant of 40 N $m^{-1}$ and a resonance frequency of 300 kHz (# MPP-11200-10; Bruker AFM Probes, Camarillo, Calif., USA). Nova Px 3.2.5 software was used to acquire and process the images. The as-acquired height images were subjected to a fourth order fit lines 1D flatten correction.

Particle imaging was also performed. Graphenic dispersions in water (100 μg $mL^{-1}$) were briefly bath sonicated (20 min) to disperse large flocculants. Then, 20 μL aliquots were drop cast onto microscope slides and allowed to air dry. Microscope slides were covered with #1.5 microscopy coverslips and secured with tape to prevent the introduction of artifacts (such as adhesives). Bright field, color imaging was performed on an EVOS® FL Auto Cell Imaging System using a 40×, 0.65 numerical aperture, long working distance objective. To identify particles, images were converted to 8-bit grayscale images in ImageJ. Then, the images were intensity thresholded, converted to binary, had any open structures closed with the "binary close" function, manually verified and adjusted as needed, and then quantified using the "analyze particles" function, excluding any objects <4 $pixels^2$. The average area and standard error of the mean were calculated from all detected particles, with n>100 particles per sample. Pixel area was converted to microns through our imaging systems known image pixel-to-size conversion. Diameters were calculated from areas using the equation of an area for a circle. Histograms of particle size distribution were created using the "hist" function in MAT-LAB (The MathWorks, Inc.).

As noted, the data collected from these procedures is illustrates in FIGS. 14-19. FIG. 14 shows images of graphenic dispersions in water at a concentration of 1 mg $mL^{-1}$ with gentle stirring. FIG. 15 shows the absorption spectroscopy of aqueous dispersions of graphenic materials, specifically, the spectra in the ultraviolet-visible spectrum in graph A and the zoom-in view of the n-$\pi^*$ and $\pi$-plasmon features in graph B. FIG. 16 shows the sealing capacity of graphenic dispersions or FGM sealants (350 µg mL$^{-1}$) in polypropylene syringes containing defects on the order of 250 µm in images A, B, D, and C. Optical microscopy images of the interior and exterior of syringe defects before and after the addition of the FGM sealants (CGO 2:1 and CCG) are shown in images C and F, including images of the syringe and defect before and after the addition of the FGM sealants, along with the amount of volume of liquid lost after addition of the FGM sealant and repair of the defect. In some embodiments in which the defects were successfully sealed, the defects in the syringes were on the order of 0.07 mm$^2$, and the concentration of FGM materials was on the order of 25 mg/L.

For comparison, FIG. 17 shows the sealing capacity of 350 µg mL$^{-1}$ dispersions of unfunctionalized graphenic materials in syringes containing defects on the order of 250 µm in images A, B, D, and E. Optical microscopy images of the syringe defects (exterior and interior) before and after the addition of the GO 2:1 and CG are shown in images C and F, along with the amount of volume of liquid lost after addition of the FGM sealant and repair of the defect.

FIG. 18 illustrates the AFM images of FGM sealed defects extracted from syringes. FIG. 19 illustrates particle and flocculant characterizations of FGMs and the unfunctionalized graphenic materials. Representative optical images of the aqueous suspensions of unfunctionalized scaffolds are shown in images A and those of the FGM sealants are shown in images B. Images C and E show the average particle diameter determined via high-resolution optical microscopy of the corresponding optical images in A and B. Bars are sample mean and error bars are standard error. The distribution of image-determined particle diameters and shown in graphs D and F, noting that the data are offset for clarity.

Based on the above analyses, the FGM sealants, which are the catechol-graphene conjugates, can assemble into solid constructs in water resembling sealant plugs that are more stable than GOs and CG. The linear viscoelastic regions and cohesive energies increased significantly for FGM sealants compared to unfunctionalized materials. This suggests FGM sealants create more stable constructs in water due to stronger cohesive interactions between graphenic sheets. Further, the cohesive properties of all FGM sealants were similar to each other. It should be appreciated that basal plane oxidation in FGM sealants is masked by the presence of DHBA. DHBA can form strong hydrogen bonds and participate in $\pi$-$\pi$ aromatic interactions that result in inter-sheet stacking between graphenic backbones in FGM sealants. The above analyses can be used to evaluate whether other scaffold materials, including other graphenic materials, and bound small molecules having adhesive properties may be provide the desired properties to be used as adhesives or sealants.

It should be appreciated that based on the foregoing tests, that a range of ratios of adhesive molecules to graphene material may be used to produce an FGM that performs as an adhesive or sealant. However, it should be appreciated that a smaller ratio may be more efficient in that any excess adhesive molecule used would not be wasted. In other words, as the amount of adhesive molecule is increased relative to the graphenic material, a saturation point may be reached that limits further ability to covalently bond the adhesive molecule to the graphenic scaffold due to a lack of available carboxylic acids on the graphenic material. Any unbound adhesive molecules would not simply be washed away during purification of the FGM. Nonetheless, the FGM, despite the excess adhesive molecule, would still perform as an adhesive or sealant. Accordingly, in some embodiments, a weight ratio of adhesive molecule to graphenic material in the range of approximately 1:1-10:1 may be used. In some embodiments, a weight ratio of adhesive molecule to graphenic material in the range of approximately 1:1-5:1 may be used. In some embodiments, a weight ratio of adhesive molecule to graphenic material in the range of approximately 1:1-2.5:1 may be used. In some embodiments, a weight ratio of adhesive molecule to graphenic material of approximately 1:1, 2.5:1, or 5:1 may be used.

In use, the FGMs of the present invention, identified and synthesized as described above and having the properties described above, may be used in a variety of applications. Generally, the FGMs of the present invention may be used as sealants or adhesives. In some embodiments, the FGMs of the present invention may be used as sealants to repair leaks or defects in tubes or pipes carrying a fluid. In some embodiments, the FGMs of the present invention may be used in-situ to repair leaks or defects in tubes or pipes carrying a fluid. In some embodiments, the FGMs of the present invention may be used in-situ to repair leaks or defects in a condenser tube used in a power plant, such as a Rankine cycle power plant. In such embodiments, the FGM may simply be added to the fluid being carried in the tube or pipe during its normal use, and the FGM will adhere to the location of the defect or leak, such as an opening or leak in the wall of the tube or pipe, and provide a repair, which may be a seal that reduces or eliminates the leak or that repairs a defect that may have otherwise become a leak. It should be appreciated that the pressure drop across the defect or leak acts to direct the FGM to the site of the defect or leak.

Qualitatively, FGM sealants can adhere to metal surfaces. This was observed during rheological testing with steel and aluminum geometries. After mechanical testing was complete, FGM sealants stuck to the upper, steel geometry and lower, aluminum geometry. Unfunctionalized GOs and CG scaffolds did not exhibit the same metal adhesive properties. Accordingly, the adhesion and stability of FGM sealants to metal condenser tubes will be stronger than the non-polar, polypropylene syringes used above for evaluating the sealing capacity of the FGMs. Therefore, once directed to the site of a defect or leak in a metal surface based upon an existing pressure drop, the FGM is attracted to the area of the metal surface and adheres at that location, thereby building up a seal and effectively reducing or eliminating the leak.

Figure 20:
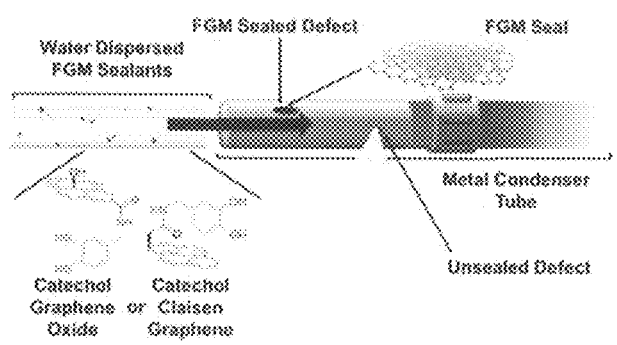
FIG. 20 illustrates a process for using an FGM according to one embodiment of the invention.

FIG. 20 illustrates a process for using an FGM according to one embodiment of the invention. As shown, a condenser tube 2002 is illustrated with an unsealed defect or leak 2004 illustrating the loss of fluid from the condenser tube. A repaired leak 2006 is also shown that includes a plug or seal made from an FGM 2008. To repair the existing leak 2004, an FGM, such as catechol graphene oxide (CGO) 2010 or catechol Claisen graphene (CCG) 2012, may be added to the fluid 2014 such that the FMG is dispersed within the fluid 2014 to form a fluid-dispersed FGM sealant. It should be appreciated that the fluid may be the working fluid that is typically transported by the tube, in this case, water that is flowing through the condenser tube during normal use. In this case, the FGM can be added to the water such that the repair occurs in-situ and without having to take the condenser tube out of service. Alternatively, the FGM material could be added to a fluid, such as water, that is simply passed through the tube with a leak or defect while the tube is out of service. In either case, the repair may be done in-situ without having to remove the leaking tube for repair. The amount of FGM needed and the contact time required between the FGM and the defect or leak will vary. For example, larger defects will require more material. Due to circulating water, larger defects may also take longer to seal as the FGM plug increases in size. It should be appreciated that the magnitude of the pressure drop at the site of the defect or leak will also affect the amount of FGM drawn to that location, which in turn will affect the amount of FGM that needs to be added to the fluid. Nonetheless, the amount of FGM needed to provide a seal for the defect or leak can be determined based on the sufficiency of the repair or reduction in the size of the leak.

Various embodiments of the invention have been described above. However, it should be appreciated that alternative embodiments are possible and that the invention is not limited to the specific embodiments described above. For example, other materials may be used as the scaffold and adhesive molecule. In these instances, the analyses described above may be used to determine whether such scaffold or adhesive or various combinations of such would perform sufficiently as an adhesive or sealant and whether such would provide repair of a surface defect or leak in-situ.

What is claimed is:

1. A seal in an opening in a tube wall, comprising:
   an opening in a tube wall;
   a seal comprising a graphenic scaffold having a covalently attached molecule a catechol or catechol derivative, wherein said seal is adhered to a portion of said tube wall thereby covering said opening.

2. The seal of claim 1, wherein said graphenic scaffold comprises graphene oxide.

3. The seal of claim 1, wherein said graphenic scaffold comprises Claisen Graphene.

4. The seal of claim 1, wherein said catechol comprises 1,2-dihydroxybenzene.

5. The seal of claim 1, wherein said catechol derivative comprises a catecholamine.

6. A method for reducing a leak in a tube, comprising:
   adding a sealant to a fluid passing through a tube, wherein said sealant comprises a graphenic scaffold having a covalently attached molecule a catechol or catechol derivative and wherein said tube comprises a leak through which said fluid is passing;
   adhering said sealant to said tube adjacent to said leak; and
   forming a seal comprising said sealant, thereby covering said leak.

7. The method of claim 6, wherein said graphenic scaffold comprises graphene oxide.

8. The method of claim 6, wherein said graphenic scaffold comprises Claisen Graphene.

9. The method of claim 6, wherein said catechol comprises 1,2- dihydroxybenzene.

10. The method of claim 6, wherein said catechol derivative comprises a catecholamine.

11. The method of claim 6, wherein said forming comprises preventing said fluid from passing through the leak.

12. The seal of claim 5, wherein said catecholamine comprises 3,4-dihydroxybenzylamine.

13. The seal of claim 10, wherein said catecholamine comprises 3,4-dihydroxybenzylamine.

* * * * *